(12) United States Patent
Kosaka et al.

(10) Patent No.: US 12,489,342 B2
(45) Date of Patent: Dec. 2, 2025

(54) ELECTRIC MOTOR

(71) Applicant: Mitsubishi Electric Corporation, Tokyo (JP)

(72) Inventors: Shunsuke Kosaka, Tokyo (JP); Seiji Haga, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 215 days.

(21) Appl. No.: 18/548,250

(22) PCT Filed: Mar. 8, 2021

(86) PCT No.: PCT/JP2021/008941
§ 371 (c)(1),
(2) Date: Aug. 29, 2023

(87) PCT Pub. No.: WO2022/190163
PCT Pub. Date: Sep. 15, 2022

(65) Prior Publication Data
US 2024/0146153 A1 May 2, 2024

(51) Int. Cl.
*H02K 9/06* (2006.01)

(52) U.S. Cl.
CPC ..................... *H02K 9/06* (2013.01)

(58) Field of Classification Search
CPC .. H02K 1/20; H02K 1/32; H02K 5/20; H02K 5/207; H02K 9/06; H02K 9/08; H02K 9/10; H02K 9/12; H02K 9/14; H02K 9/16; H02K 9/18
See application file for complete search history.

(56) References Cited

U.S. PATENT DOCUMENTS

2011/0315460 A1* 12/2011 Sakane ............... B61C 17/04
180/65.1
2012/0062057 A1 3/2012 Nagayama et al.

FOREIGN PATENT DOCUMENTS

| GB | 561552 A | * | 5/1944 | ............... H02K 9/18 |
| JP | 2007135289 A | | 5/2007 | |
| JP | 2010098791 A | | 4/2010 | |
| JP | 2010220417 A | | 9/2010 | |
| WO | 2009034607 A1 | | 3/2009 | |

OTHER PUBLICATIONS

International Search Report (PCT/ISA/210) with translation and Written Opinion (PCT/ISA/237) mailed on May 11, 2021, by the Japan Patent Office as the International Searching Authority for International Application No. PCT/JP2021/008941. (9 pages).

* cited by examiner

*Primary Examiner* — Eric Johnson
(74) *Attorney, Agent, or Firm* — Buchanan Ingersoll & Rooney PC

(57) ABSTRACT

An electric motor includes a shaft, a rotor, a stator, a first bracket, a second bracket, a bypass definer, a first guide, and a second guide. The bypass definer defines an internal air bypass located radially outward from the stator for internal air to flow through. The first guide transfers heat transferred from the internal air passing through inside a plurality of first partition walls connecting the internal air bypass and an internal space to external air and guides the external air to an external air passage. The second guide transfers heat transferred from the internal air passing through inside a second partition wall connecting the internal air bypass and an internal space to the external air and guides the external air outside.

20 Claims, 21 Drawing Sheets

ELECTRIC MOTOR

TECHNICAL FIELD

The present disclosure relates to an electric motor.

BACKGROUND ART

An electric motor includes a shaft, a rotor attached to the shaft rotatable integrally with the shaft, a stator radially opposing the rotor with a space therebetween, and a bearing supporting the shaft rotatably. When the electric motor is energized, the temperature rises in the stator and the rotor included in the electric motor. The temperature rises in components of the electric motor may accelerate, for example, degradation of stator coil insulation and rotor conductor insulation as well as degradation of grease for bearing lubrication, thus possibly affecting the life of the electric motor.

In a totally enclosed electric motor installed under the floor of a railway vehicle, external air flowing outside the electric motor is caused to flow through air passages formed in a stator, and internal air flowing inside the electric motor is caused to flow through air passages in the rotor, so that the stator and the rotor are cooled. The temperature of the internal air is higher than the temperature of the external air. Thus, cooling using internal air is less efficient than cooling using external air. To increase the cooling performance of such a totally enclosed electric motor using external air and internal air to cool the stator and the rotor, the internal air is preferably circulated while an increase in the internal air temperature is being suppressed.

An electric motor disclosed in Patent Literature 1 includes a stator and a rotor each including an air passage. A heat exchanger including an air passage connecting to the inside of the electric motor is located outside the electric motor, or specifically, located radially outward from the stator with a space therebetween. The electric motor described in Patent Literature 1 uses external air flowing through the air passage in the stator to cool the stator, and internal air flowing in the air passage in the rotor to cool the rotor. The electric motor uses internal air flowing through the air passage in the heat exchanger with fins located over the entire outer circumferential surface to suppress an increase in the internal air temperature.

CITATION LIST

Patent Literature

Patent Literature 1: Unexamined Japanese Patent Application Publication No. 2007-135289

SUMMARY OF INVENTION

Technical Problem

To cool the electric motor described in Patent Literature 1 more efficiently, for example, the size of the fan needs to be increased to increase the airflow rate. However, increasing the airflow rate increases the windage loss, thus lowering the efficiency of the electric motor.

In response to the above circumstances, an objective of the present disclosure is to provide an electric motor with high motor efficiency and high cooling performance.

Solution to Problem

To achieve the above objective, an electric motor according to an aspect of the present disclosure includes a shaft, a rotor, a stator, a first bracket, a second bracket, a bypass definer, a first guide, and a second guide. The shaft is supported rotatably about a rotation axis. The rotor is located radially outward from the shaft rotatable integrally with the shaft. The stator radially opposes the rotor with a space therebetween and includes an external air passage. The external air passage is a through-hole open at both ends in a direction of extension of the rotation axis. The first bracket has an inlet hole through which external air is introduced. The second bracket opposes the first bracket in the direction of extension of the rotation axis with the rotor and the stator being located between the first bracket and the second bracket. The bypass definer defines an internal air bypass located radially outward from the stator for internal air to flow through. The first guide includes a first tube located between the first bracket and the stator, and multiple first partition walls. The multiple first partition walls are hollow, extend from an outer circumferential surface of the first tube, and connect the internal air bypass and an internal space of the first tube. The first guide transfers heat transferred from the internal air passing through inside the plurality of first partition walls to the external air drawn in through the inlet hole and guides the external air to the external air passage. The second guide includes a second tube located between the second bracket and the stator, and a second partition wall. The second partition wall is hollow, extends from an outer circumferential surface of the second tube, and connects the internal air bypass and an internal space of the second tube. The second guide transfers heat transferred from the internal air passing through inside the second partition wall to the external air after passing through the external air passage and guides the external air outside.

Advantageous Effects of Invention

The electric motor according to the above aspect of the present disclosure includes the first guide with the tubular first partition walls that connect the internal air bypass and the internal space, and the second guide with the tubular second partition wall that connects the internal air bypass and the internal space. The first guide transfers heat transferred from the internal air passing through inside the multiple first partition walls to the external air, and the second guide transfers heat transferred from the internal air passing through inside the second partition wall to the external air. This suppresses a temperature increase in the internal air in the electric motor. The electric motor thus has high motor efficiency and high cooling performance.

DESCRIPTION OF EMBODIMENTS

An electric motor according to one or more embodiments of the present disclosure is described in detail with reference to the drawings. In the figures, the same reference signs denote the same or equivalent components.

Embodiment 1

Figure 1:
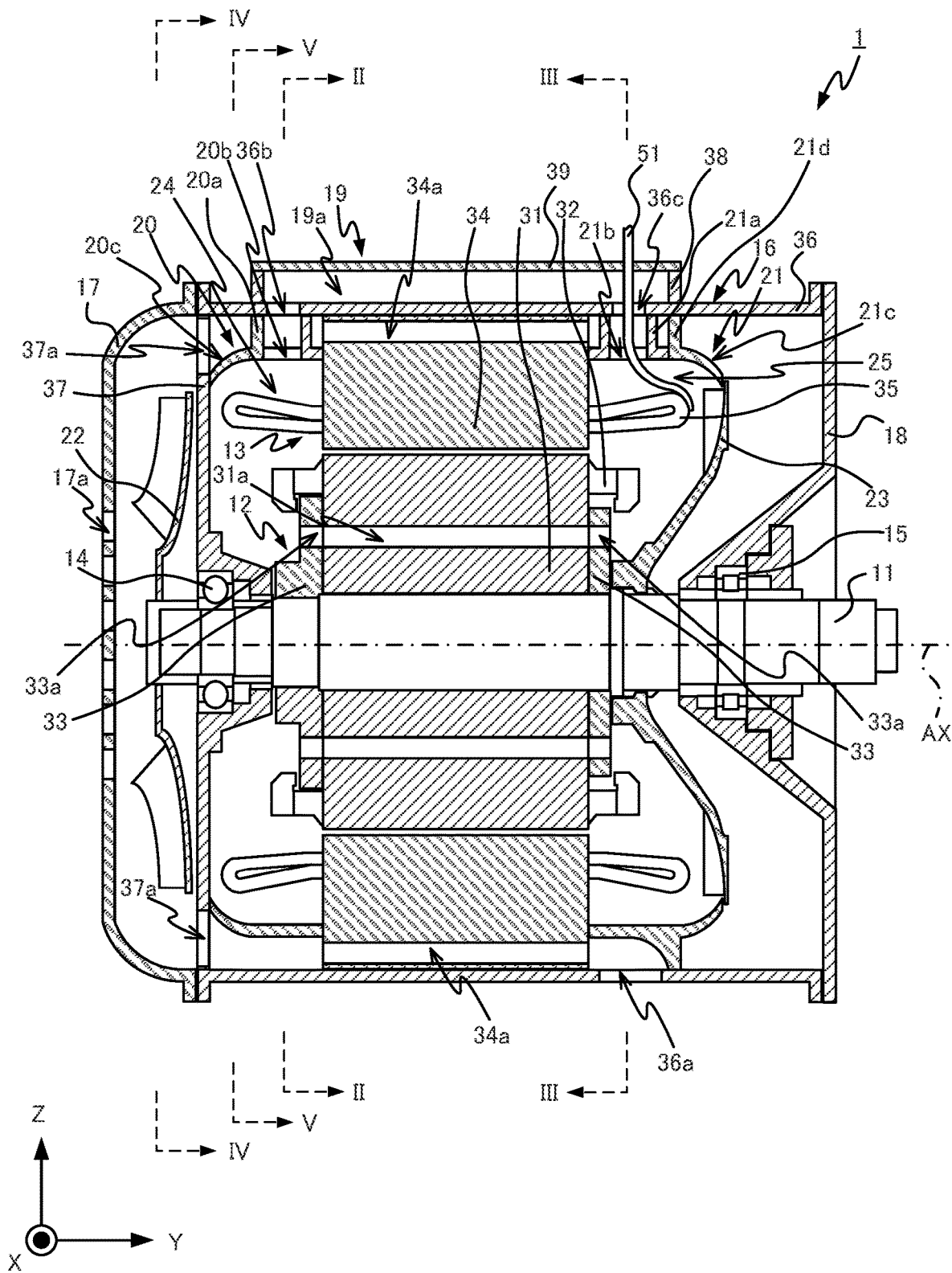
FIG. 1 is a cross-sectional view of an electric motor according to Embodiment 1.

A totally enclosed electric motor for driving a railway vehicle is described as an electric motor 1 according to Embodiment 1. The electric motor 1 illustrated in FIG. 1 is installed under a railway vehicle floor. The electric motor 1 includes components that are cooled by flow of external air outside the electric motor 1 and flow of internal air inside the electric motor 1. In FIG. 1, Z-axis indicates the vertical direction, Y-axis indicates the width direction of the railway vehicle, and X-axis indicates the traveling direction of the railway vehicle. In other words, the railway vehicle moves in the positive X-direction or the negative X-direction. X-axis, Y-axis, and Z-axis are orthogonal to one another.

The electric motor 1 includes a shaft 11 supported rotatably about a rotation axis AX indicated by a dot-dash line in FIG. 1, a rotor 12 located radially outward from the shaft 11 rotatable integrally with the shaft 11, a stator 13 radially opposing the rotor 12 with a space therebetween, and bearings 14 and 15 supporting the shaft 11 in a rotatable manner. The electric motor 1 further includes a frame 16 accommodating the rotor 12, the stator 13, and the bearings 14 and 15 with the shaft 11 received inside, a first bracket 17 and a second bracket 18 opposing each other in a direction of extension of the rotation axis AX with the frame 16 being located between the first bracket 17 and the second bracket 18, and a bypass definer 19 defining an internal air bypass 19a.

The electric motor 1 further includes a first guide 20 with a first tube located between the first bracket 17 and the stator 13 and multiple hollow first partition walls 20a connecting the internal air bypass 19a and an internal space 24 inside the first tube, and a second guide 21 with a second tube located between the second bracket 18 and the stator 13 and a hollow second partition wall 21a connecting the internal air bypass 19a and an internal space 25 inside the second tube.

The electric motor 1 further includes an outer fan 22 and an inner fan 23. The outer fan 22 is attached to the shaft 11 and draws in external air as it rotates. The inner fan 23 is attached to the shaft 11 and circulates internal air as it rotates.

Heat is transferred from the internal air passing through inside the first partition walls 20a and the second partition wall 21a to the external air flowing around the first partition walls 20a and the second partition wall 21a, thus lowering the temperature of the internal air. This improves the cooling performance of the electric motor 1. The cooling performance of the electric motor 1 is increased without increasing the size of the outer fan 22 and the inner fan 23 for more airflow. Thus, the electric motor 1 has high motor efficiency and high cooling performance.

The components of the electric motor 1 are described in detail.

The shaft 11 has one end closer to the second bracket 18 coupled to an axle of the railway vehicle with a joint and a gear, which are not illustrated. The shaft 11 rotates to power the railway vehicle.

Figure 2:
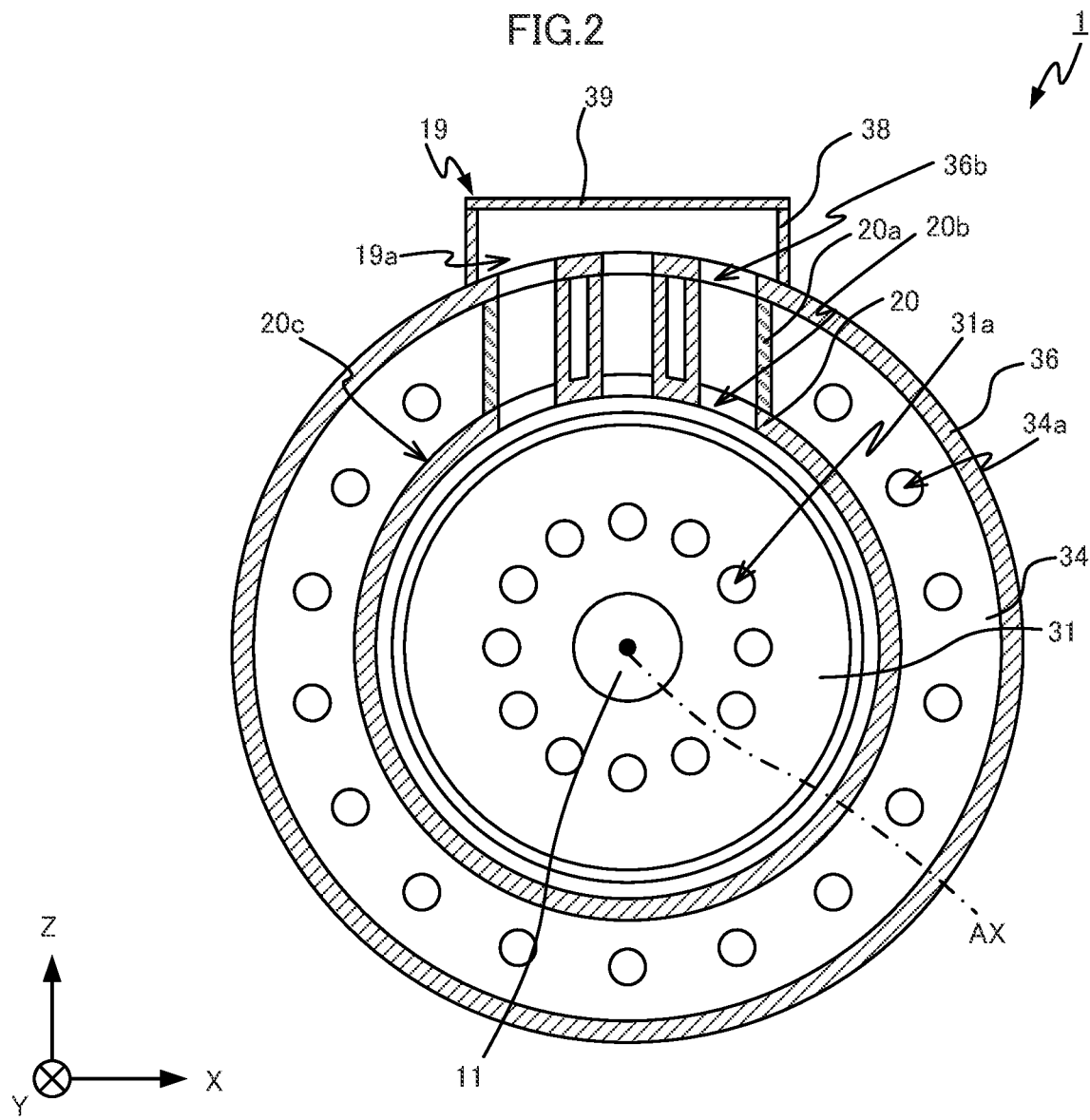
FIG. 2 is a cross-sectional view of the electric motor according to Embodiment 1 taken along line II-II as viewed in the direction indicated by the arrows in FIG. 1.

The rotor 12 includes a rotor core 31 attached to the shaft 11, rotor conductors 32 placed in slots in the outer circumferential surface of the rotor core 31, and a pair of clamps 33 that clamp and fix the rotor core 31 in between in the direction of extension of the rotation axis AX. The rotor core 31 includes rotor air passages 31a that are through-holes open at the both ends of the rotor core 31 in the direction of extension of the rotation axis AX. In Embodiment 1, the rotor air passages 31a extend through the rotor core 31 in the direction of extension of the rotation axis AX, or Y-direction. As illustrated in FIG. 2 that is a cross-sectional view taken along line II-II as viewed in the direction indicated by the arrows in FIG. 1, the rotor core 31 includes the rotor air passages 31a arranged in the circumferential direction. For ease of illustration, the rotor conductors 32, the clamps 33, and a stator coil 35, which is described later, are not illustrated in FIG. 2.

As illustrated in FIG. 1, each clamp 33 has through-holes 33a connecting to the rotor air passages 31a. The through-holes 33a extend through each clamp 33 in Y-direction. The internal air flows successively through the through-holes 33a in one clamp in the pair of clamps 33, the rotor air passages 31a, and the through-holes 33a in the other clamp in the pair of clamps 33. This transfers heat generated in the rotor 12 to the internal air, thus cooling the rotor 12.

The stator 13 includes a stator core 34 fixed to the inner circumferential surface of the frame 16, and the stator coils 35 placed in slots in the stator core 34. The stator core 34 radially opposes the rotor core 31 with a space therebetween. The stator core 34 includes external air passages 34a. The external air passages 34a are through-holes open at the both ends of the stator core 34 in the direction of extension of the rotation axis AX. In Embodiment 1, the external air passages 34a extend through the stator core 34 in Y-direction. As illustrated in FIG. 2, the stator core 34 includes the external air passages 34a arranged in the circumferential direction.

As illustrated in FIG. 1, a lead wire 51 is routed in from outside the electric motor 1 and connected to the stator coil 35. The electric motor 1 starts operating when an electric current is fed through the lead wire 51 to the stator coil 35.

The bearing 14 is supported by the frame 16 and supports the shaft 11 in a rotatable manner.

The bearing 15 is supported by the second bracket 18 and supports the shaft 11 in a rotatable manner.

The frame 16 is fixed under the floor of the railway vehicle with fixing members, which are not illustrated. The frame 16 is tubular. In Embodiment 1, the frame 16 includes a tubular member 36 having a hollow tubular shape and a plate 37 covering one end of the tubular member 36 and supporting the bearing 14.

Figure 3:
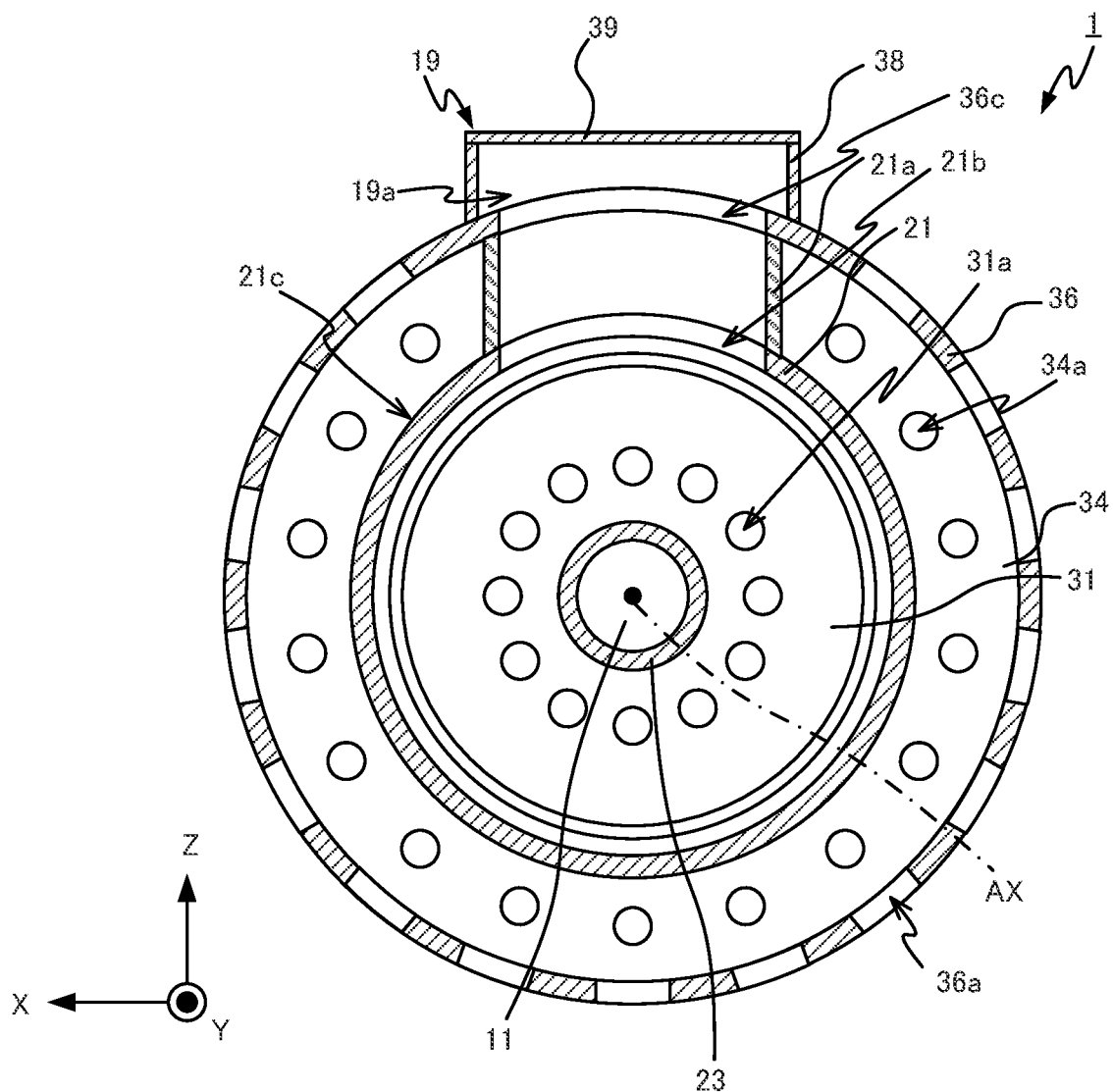
FIG. 3 is a cross-sectional view of the electric motor according to Embodiment 1 taken along line as viewed in the direction indicated by the arrows in FIG. 1.

Outlet holes 36a are located in an end of the tubular member 36 closer to the second bracket 18 to discharge the external air after passing through the external air passages 34a. The end of the tubular member 36 closer to the second bracket 18 is a portion of the tubular member 36 closer to the second bracket 18 than the stator 13. In Embodiment 1, as illustrated in FIG. 3 that is a cross-sectional view taken along line III-III as viewed in the direction indicated by the arrows in FIG. 1, multiple outlet holes 36a are arranged in the circumferential direction in the portion of the tubular member 36 closer to the second bracket 18, except in a vertically upper area. For ease of illustration, the rotor conductors 32, the clamps 33, and the stator coil 35 are not illustrated in FIG. 3. The outlet holes 36a radially extend through the tubular member 36. As illustrated in FIGS. 1 to 3, multiple first air holes 36b connecting to the internal air bypass 19a and a second air hole 36c are located in the vertically upper area of the tubular member 36.

Figure 4:
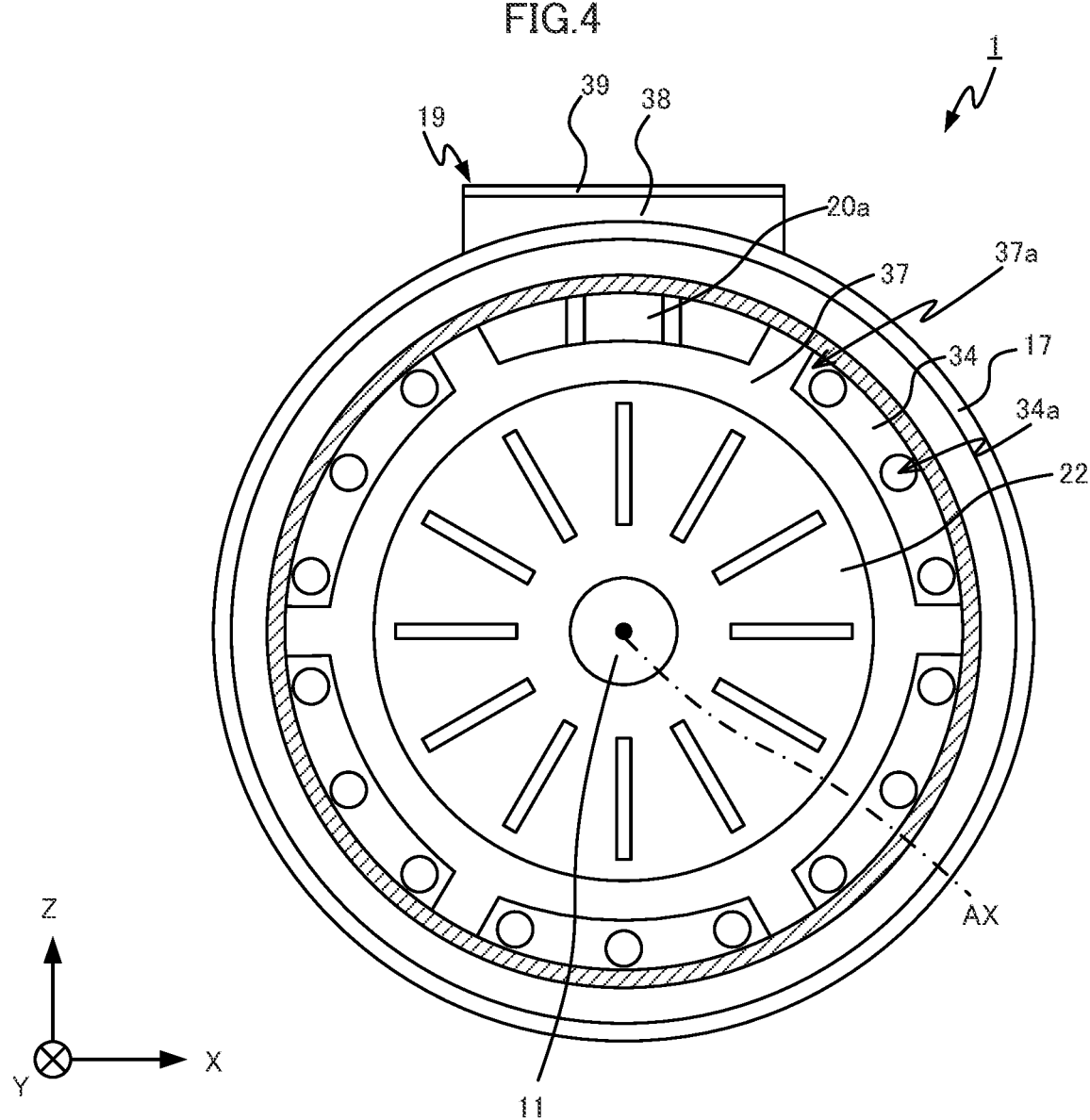
FIG. 4 is a cross-sectional view of the electric motor according to Embodiment 1 taken along line IV-IV as viewed in the direction indicated by the arrows in FIG. 1.

As illustrated in FIG. 4 that is a cross-sectional view taken along line IV-IV as viewed in the direction indicated by the arrows in FIG. 1, the plate 37 has end-face air holes 37a arranged in the circumferential direction. The end-face air holes 37a extend through the plate 37 in Y-direction. In Embodiment 1, the plate 37 has six end-face air holes 37a.

As illustrated in FIG. 1, the first bracket 17 has inlet holes 17a to draw in external air. In Embodiment 1, the inlet holes 17a extend through the first bracket 17 in Y-direction. The first bracket 17 is attached to one end of the frame 16, or specifically, to one end of the tubular member 36. The first bracket 17 may be fixed to one end of the tubular member 36 with any method, such as bonding with an adhesive, welding, or fastening with a fastener, that provides firm fixing to maintain the relative positions under vibrations from a traveling railway vehicle.

The second bracket 18 opposes the first bracket 17 in Y-direction with the rotor 12 and the stator 13 being located between the first bracket 17 and the second bracket 18. In Embodiment 1, the second bracket 18 is attached to the other end of the frame 16 accommodating the rotor 12 and the stator 13, or specifically, to the other end of the tubular member 36. The second bracket 18 may be fixed to the other end of the tubular member 36 with any method, such as bonding with an adhesive, welding, or fastening with a fastener, that provides firm fixing to maintain the relative positions under vibrations from a traveling railway vehicle.

The bypass definer 19 defines the internal air bypass 19a located radially outward from the external air passages 34a. More specifically, the bypass definer 19 covers the first air holes 36b and the second air hole 36c to define the internal air bypass 19a with the outer circumferential surface of the frame 16. The bypass definer 19 includes a mount member 38 attached to the outer circumferential surface of the tubular member 36 and a plate member 39 attached to the mount member 38 to define the internal air bypass 19a with the outer circumferential surface of the tubular member 36.

The mount member 38 is hollow and attached to the tubular member 36 with the center axis intersecting with the outer circumferential surface of the tubular member 36. More specifically, the mount member 38 is attached to the tubular member 36 to surround the first air holes 36b and the second air hole 36c. The mount member 38 may be fixed to the tubular member 36 with any method, such as bonding with an adhesive, welding, or fastening with a fastener, that provides firm fixing to maintain the relative positions under vibrations from a traveling railway vehicle.

A space surrounded by the mount member 38, the plate member 39, and the tubular member 36 of the frame 16 is the internal air bypass 19a. The plate member 39 has a through-hole to receive the lead wire 51. The through-hole for the lead wire 51 receives, for example, a cable gland to reduce contaminants, such as dust and water drops, entering the electric motor 1 through the through-hole.

The plate member 39 is preferably formed from a highly thermally conductive material, for example, metal such as copper or aluminum. The plate member 39 of a material with high thermal conductivity transfers heat from the internal air flowing through the internal air bypass 19a to the external air located radially outward from the internal air bypass 19a, thus lowering the temperature of the internal air flowing through the internal air bypass 19a. This increases the cooling performance of the electric motor 1. To further increase the cooling performance of the electric motor 1, the plate member 39 is preferably, for example, a thin plate with a thickness not greater than 6 mm. The plate member 39 being a thin plate more efficiently transfers heat from the internal air flowing through the internal air bypass 19a to the external air located radially outward from the internal air bypass 19a, further lowering the temperature of the internal air. This further increases the cooling performance of the electric motor 1.

The first guide 20 includes a first tube between the first bracket 17 and the stator 13. In Embodiment 1, the first guide 20 is accommodated in the frame 16 and attached to the plate 37 in the frame 16 at a position radially inward from the end-face air holes 37a and to the stator core 34 at a position radially inward from the external air passages 34a. The first guide 20 may be fixed to the plate 37 and the stator core 34 with any method, such as bonding with an adhesive, welding, or fastening with a fastener, that provides firm fixing to maintain the relative positions under vibrations from a traveling railway vehicle.

Figure 5:
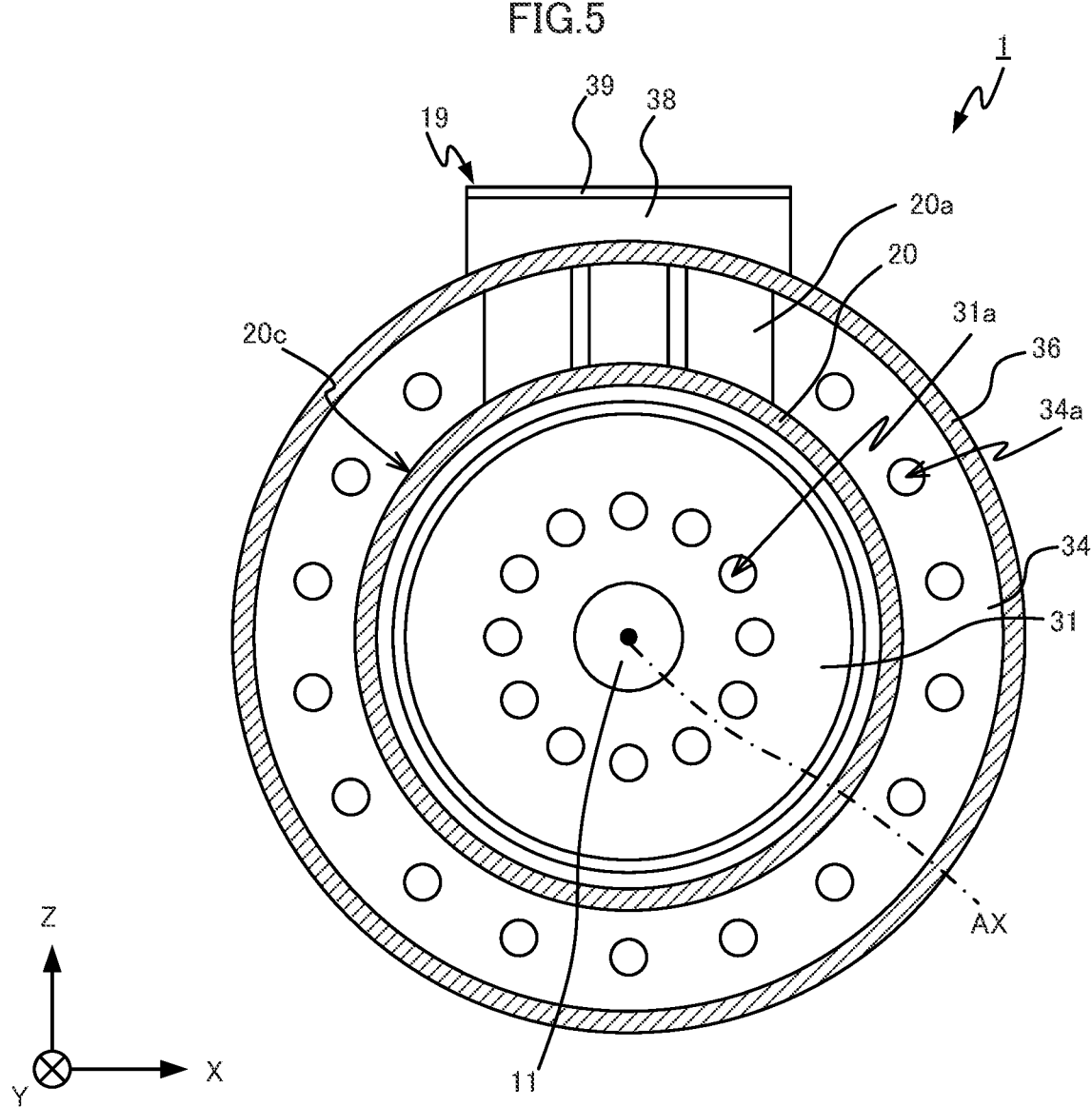
FIG. 5 is a cross-sectional view of the electric motor according to Embodiment 1 taken along line V-V as viewed in the direction indicated by the arrows in FIG. 1.

The first guide 20 includes the first partition walls 20a, each being hollow and extending from an outer circumferential surface 20c of the first tube to connect the internal air bypass 19a and an internal space 24 inside the first tube. More specifically, the first guide 20 includes as many first partition walls 20a as the first air holes 36b. In Embodiment 1, as illustrated in FIG. 5 that is a cross-sectional view taken along line V-V as viewed in the direction indicated by the arrows in FIG. 1 and in FIG. 6, the first guide 20 includes three first partition walls 20a circumferentially adjacent to one another. The internal space 24 is surrounded by the first guide 20, the plate 37, the rotor 12, and the stator 13.

More specifically, the first partition walls 20a are located on the outer circumferential surface 20c of the first guide 20.

Figure 6:
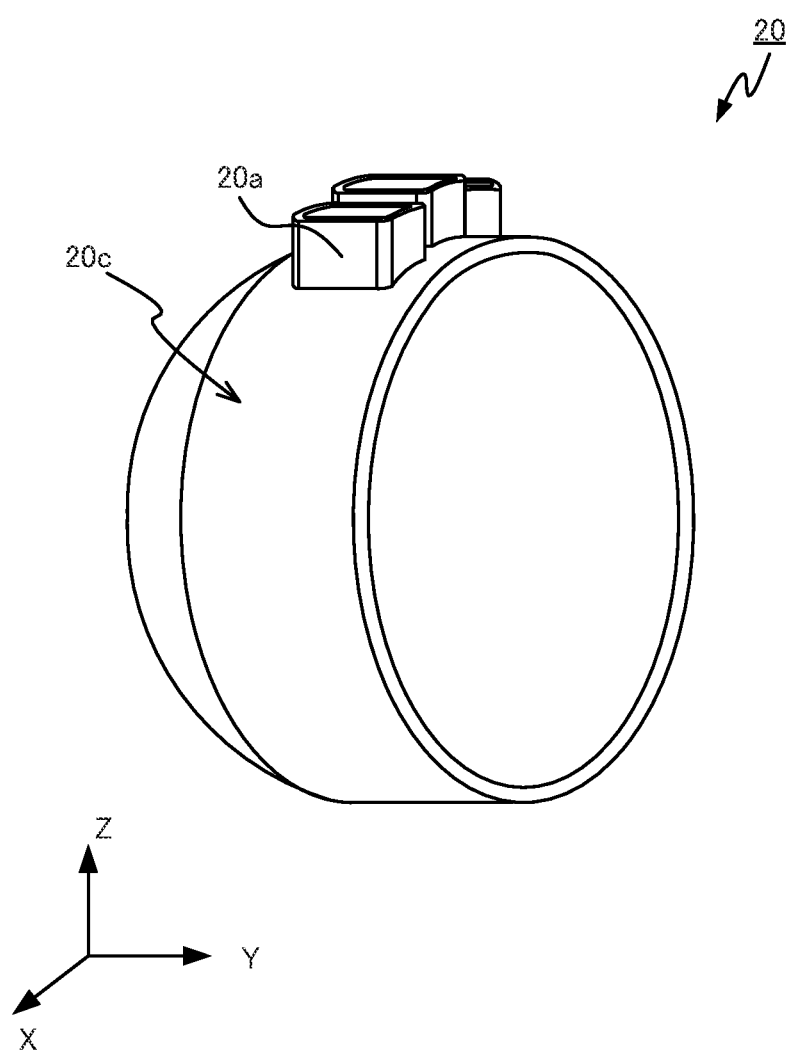
FIG. 6 is a perspective view of a first guide in Embodiment 1.

As illustrated in FIG. 2, multiple third air holes 20b, or specifically, as many third air holes 20b as the first partition walls 20a radially extend through the outer circumferential surface 20c. In Embodiment 1, as illustrated in FIG. 6, the first partition walls 20a are each a hollow rectangular prism.

Each first partition wall 20a has one end in contact with the periphery of the corresponding first air hole 36b and the other end in contact with the periphery of the corresponding third air hole 20b in the outer circumferential surface 20c of the first guide 20. This structure reduces the likelihood of the internal air flowing inside the first partition walls 20a mixing with the external air flowing around the first partition walls 20a.

The first guide 20 with the above structure guides the external air flowing in through the inlet holes 17a to the external air passages 34a, and guides the internal air after passing through the internal air bypass 19a to the internal space 24. More specifically, a portion of the external air flowing in through the inlet holes 17a flows through between the adjacent first partition walls 20a into the external air passages 34a, and another portion of the external air flowing in through the inlet holes 17a flows through around the first partition walls 20a into the external air passages 34a. The internal air after passing through the internal air bypass 19a flows through inside the first partition walls 20a into the internal space 24, and then flows into the rotor air passages 31a.

Each first partition wall 20a transfers heat transferred from the internal air flowing inside to the surrounding external air. In other words, heat is transferred through the first partition walls 20a from the internal air flowing inside the first partition walls 20a to the external air flowing through between the adjacent first partition walls 20a or around the first partition walls 20a. Thus, the internal air flowing through the first partition walls 20a is cooled.

To increase the performance of heat transfer from the internal air to the external air, each first partition wall 20a is preferably longer in the direction of extension of the rotation axis AX than in the circumferential direction. Each first partition wall 20a is preferably formed from a highly thermally conductive material, for example, metal such as copper or aluminum. The entire first guide 20 may be formed from a highly thermally conductive material. Each first partition wall 20a is preferably a hollow prism with a thickness not greater than 6 mm.

Figure 7:
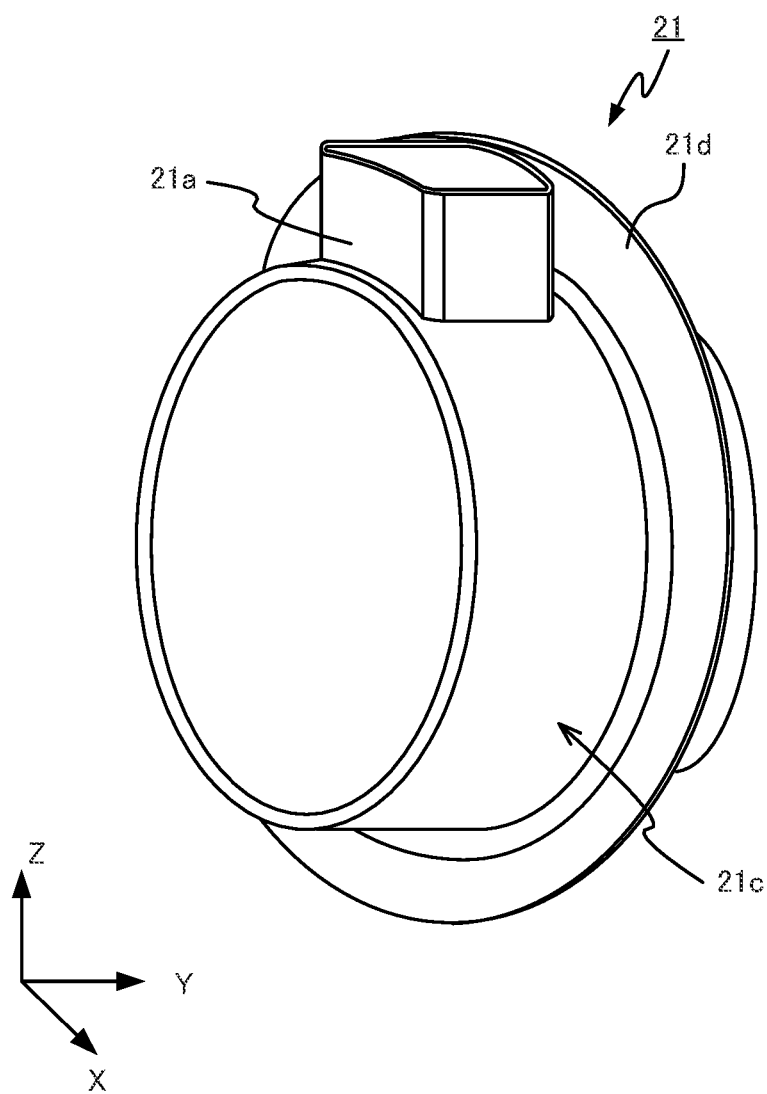
FIG. 7 is a perspective view of a second guide in Embodiment 1.

As illustrated in FIGS. 1 and 7, the second guide 21 includes a second tube between the second bracket 18 and the stator 13. In Embodiment 1, the second guide 21 is accommodated in the frame 16 and attached to the stator core 34 at a position radially inward from the external air passages 34a and to the tubular member 36. More specifically, an annular mount 21d on an outer circumferential surface 21c of the second guide 21 is attached to the inner circumferential surface of the frame 16, as illustrated in FIG. 1. The second guide 21 may be fixed to the tubular member 36 and the stator core 34 with any method, such as bonding with an adhesive, welding, or fastening with a fastener, that provides firm fixing to maintain the relative positions under vibrations from a traveling railway vehicle.

The second guide 21 includes a second partition wall 21a being hollow and extending from the outer circumferential surface 21c of the second tube to connect the internal air bypass 19a and the internal space 25 of the second tube. The internal space 25 is surrounded by the second guide 21, the inner fan 23, the rotor 12, and the stator 13. In Embodiment 1, the second guide 21 includes a single second partition wall 21a.

More specifically, the second partition wall 21a is located on the outer circumferential surface 21c of the second guide 21. As illustrated in FIG. 3, a fourth air hole 21b radially extends through the outer circumferential surface 21c. In Embodiment 1, as illustrated in FIG. 7, the second partition wall 21a is a hollow rectangular prism. The inside of the second partition wall 21a connects to the internal air bypass 19a and the internal space 25 inside the second guide 21.

The second partition wall 21a has one end in contact with the periphery of the corresponding second air hole 36c and the other end in contact with the periphery of the fourth air hole 21b in the outer circumferential surface 21c of the second guide 21. This structure reduces the likelihood of the internal air flowing inside the second partition wall 21a mixing with the external air flowing around the second partition wall 21a.

The second guide 21 with the above structure guides the external air after passing through the external air passages 34a to the outlet holes 36a, and guides the internal air from the internal space 25 to the internal air bypass 19a. More specifically, the external air after passing through the external air passages 34a flows along the outer circumferential surface 21c and the mount 21d on the second guide 21 and flows out through the outlet holes 36a. A portion of the external air after passing through the external air passages 34a flows through around the second partition wall 21a and flows out through the outlet holes 36a. The internal air from the internal space 25 flows inside the second partition wall 21a into the internal air bypass 19a.

The second partition wall 21a transfers heat transferred from the internal air flowing inside to the surrounding external air. In other words, heat is transferred through the second partition wall 21a from the internal air flowing inside the second partition wall 21a to the external air flowing around the second partition wall 21a. Thus, the internal air flowing through the second partition wall 21a is cooled.

To increase the performance of heat transfer from the internal air to the external air, the second partition wall 21a is preferably formed from a highly thermally conductive material, for example, metal such as copper or aluminum. The entire second guide 21 may be formed from a highly thermally conductive material. The second partition wall 21a may be a hollow prism with a thickness not greater than 6 mm.

The outer fan 22 is attached to the shaft 11 at a position between the first bracket 17 and the stator 13 rotatable integrally with the shaft 11. The outer fan 22 includes multiple blades in an area facing the first bracket 17.

The inner fan 23 is attached to the shaft 11 at a position between the second bracket 18 and the stator 13 with the outer edge of the inner fan 23 adjacent to the second guide 21 rotatable integrally with the shaft 11. The outer edge of the inner fan 23 is the radially outermost portion of the inner fan 23. The inner fan 23 includes multiple blades in an area facing the stator core 34 and the rotor core 31. The outer edge of the inner fan 23 preferably defines a labyrinth channel with the second guide 21. With the labyrinth channel defined by the outer edge of the inner fan 23 and the second guide 21, the internal air from the internal space 25 is guided smoothly to the internal air bypass 19a.

The lead wire 51 is routed through the through-hole in the plate member 39, the second air hole 36c, and the fourth air hole 21b to the inside of the electric motor 1 and connected to the stator coil 35.

The flow of the external air and the flow of the internal air in the electric motor 1 with the above structure being energized is described below with reference to FIG. 8. When an electric current is fed through the lead wire 51 to the stator coil 35 to supply power to the electric motor 1, the rotor 12 rotates, and the shaft 11, the outer fan 22, and the inner fan 23 rotate integrally with the rotor 12.

Figure 8:
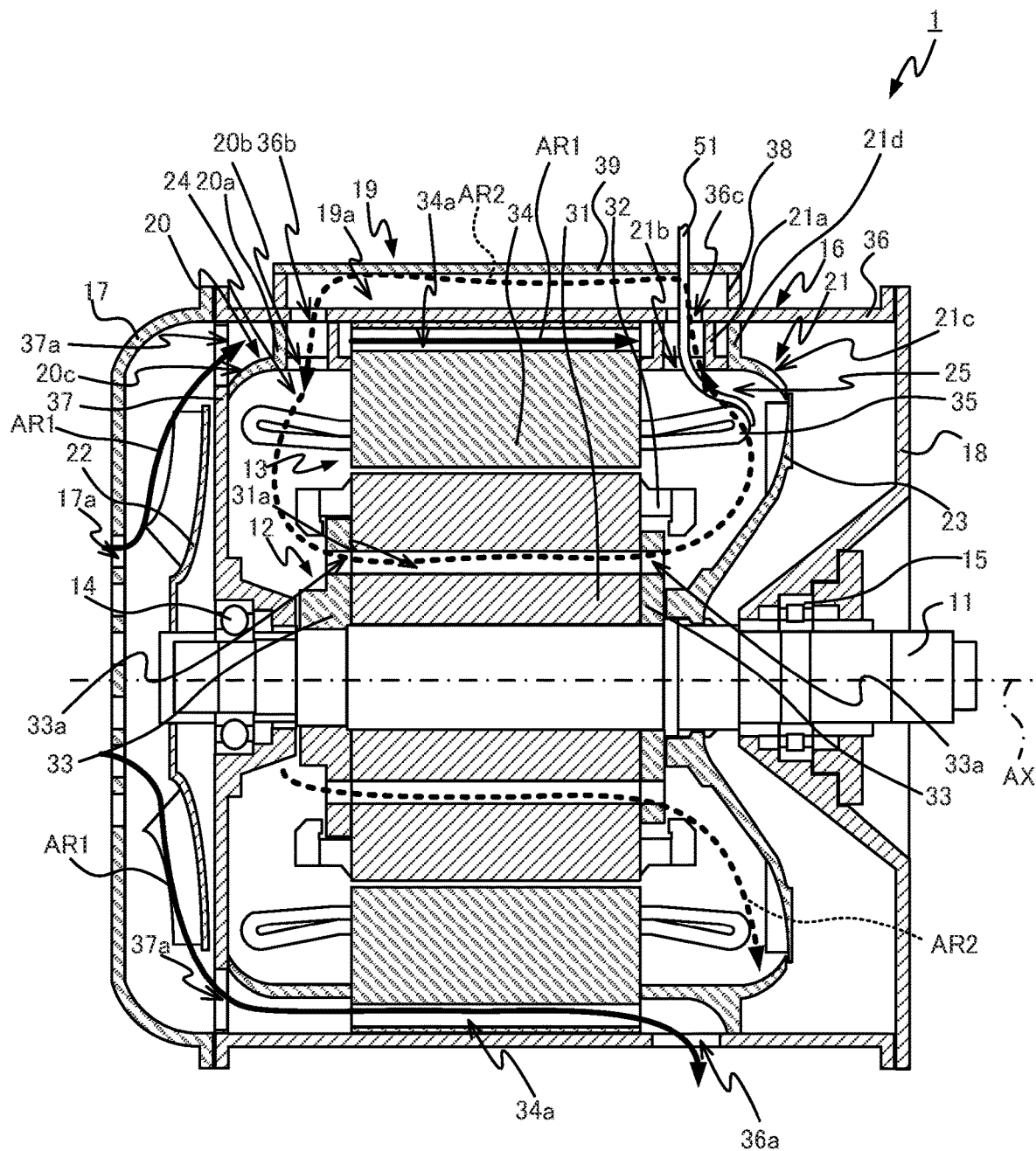
FIG. 8 is a diagram illustrating flow of external air and flow of internal air in the electric motor according to Embodiment 1.

As the outer fan 22 rotates, the external air flows as indicated by solid line arrows AR1 in FIG. 8. More specifically, rotation of the outer fan 22 causes the external air to flow through the inlet holes 17a of the first bracket 17. The external air flowing in through the inlet holes 17a radially flows toward the end-face air holes 37a.

The external air after passing through the end-face air holes 37a flows along the first guide 20 toward the external air passages 34a and flows into the external air passages 34a. The external air after passing through the end-face air holes 37a in the vertically upper area flows through between the adjacent first partition walls 20a or around the first partition walls 20a, into the external air passages 34a. Heat is transferred, by the flow of the external air described above, from the internal air flowing inside the first partition walls 20a to the external air, thus cooling the internal air.

When the external air flows through the external air passages 34a, heat is transferred from the stator 13 to the external air, thus cooling the stator 13. The external air after passing through the external air passages 34a flows along the second guide 21 and flows out through the outlet holes 36a. Of the external air described above, a portion of the external air after passing through the external air passages 34a located in the vertically upper area flows along the second partition wall 21a and then along the second guide 21, and flows out through the outlet holes 36a. Heat is transferred, by the flow of the external air described above, from the internal air flowing inside the second partition wall 21a to the external air, thus cooling the internal air.

As the inner fan 23 rotates, the internal air flows as indicated by dotted-line arrows AR2 in FIG. 8. More specifically, rotation of the inner fan 23 causes the internal air in the internal space 25 inside the second guide 21 to radially flow. The radially-flown internal air flows along the second guide 21 toward the fourth air hole 21b.

The internal air after passing through the fourth air hole 21b flows into the second partition wall 21a. As described above, heat is transferred from the internal air flowing inside the second partition wall 21a to the external air flowing along the second partition wall 21a, thus cooling the internal air. The internal air after passing through the second partition wall 21a flows through the second air hole 36c into the internal air bypass 19a. When the internal air flows through the internal air bypass 19a, heat is transferred through the plate member 39 from the internal air to the external air located radially outward from the plate member 39, thus cooling the internal air.

The internal air after passing through the internal air bypass 19a flows through the first air holes 36b into the first partition walls 20a. As described above, heat is transferred from the internal air flowing inside the first partition walls 20a to the external air flowing through between the adjacent first partition walls 20a or around the first partition walls 20a, thus cooling the internal air. The internal air after passing through the first partition walls 20a flows along the first guide 20 toward the through-holes 33a connecting to the rotor air passages 31a.

The internal air then passes successively through the through-holes 33a in one clamp in the pair of clamps 33, the rotor air passages 31a, and the through-holes 33a in the other clamp in the pair of clamps 33, and is directed radially again as the inner fan 23 rotates. As described above, the internal air circulates inside the electric motor 1.

As described above, the electric motor 1 according to Embodiment 1 includes the first partition walls 20a and the second partition wall 21a to receive heat from the internal air and transfer the heat to the external air. More specifically, heat is transferred from the internal air passing through the first partition walls 20a to the external air flowing through between the adjacent first partition walls 20a or along the first partition walls 20a, as well as from the internal air passing through the second partition wall 21a to the external air flowing along the second partition wall 21a. This cools the internal air and thus improves the cooling performance of the electric motor 1 without increasing the size of the outer fan 22 and the inner fan 23. In other words, the electric motor 1 has high motor efficiency and high cooling performance.

Embodiment 2

The electric motor 1 according to Embodiment 1 includes a single internal air bypass 19a located in a vertically upper portion, but an electric motor may include multiple internal air bypasses. An electric motor 2 including multiple internal air bypasses according to Embodiment 2 is described.

Figure 9:
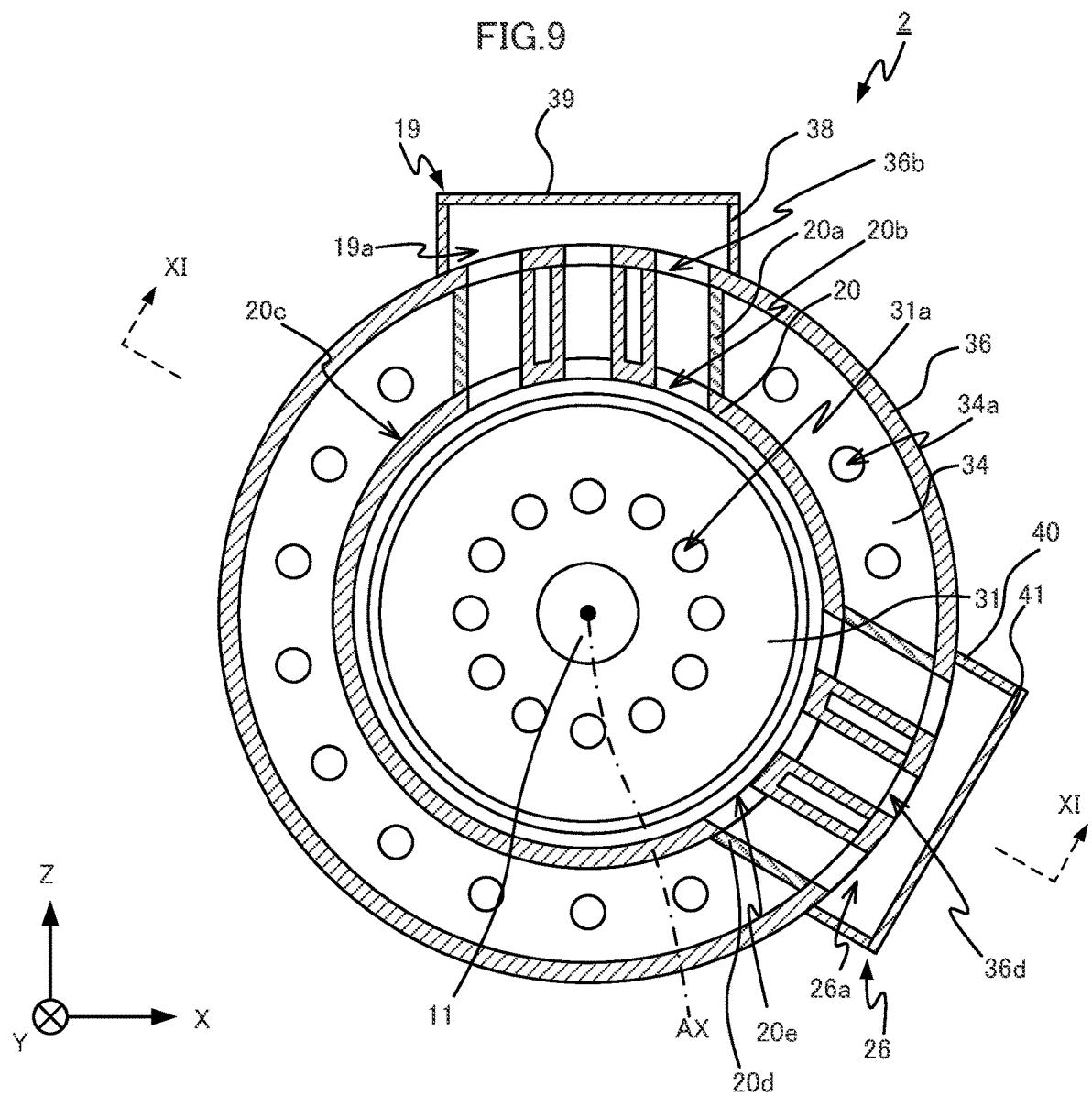
FIG. 9 is a cross-sectional view of an electric motor according to Embodiment 2.

A cross-sectional view of the electric motor 2 taken along a YZ plane is the same as FIG. 1. As illustrated in FIG. 9 that is a cross-sectional view of the electric motor 2 taken along the same line as in FIG. 2, and FIG. 10 that is a cross-sectional view of the electric motor 2 taken along the same line as in FIG. 3, the electric motor 2 further includes a bypass definer 26 of the same shape as the bypass definer 19, in addition to the components of the electric motor 1 according to Embodiment 1. More specifically, to circulate the internal air, the electric motor 2 further includes the bypass definer 26 defining an internal air bypass 26a located in a positive X-direction portion of the vertically lower area of the tubular member 36 and outward radially from the external air passages 34a.

The electric motor 2 is described in detail below, focusing on the differences from the electric motor 1 according to Embodiment 1.

Figure 10:
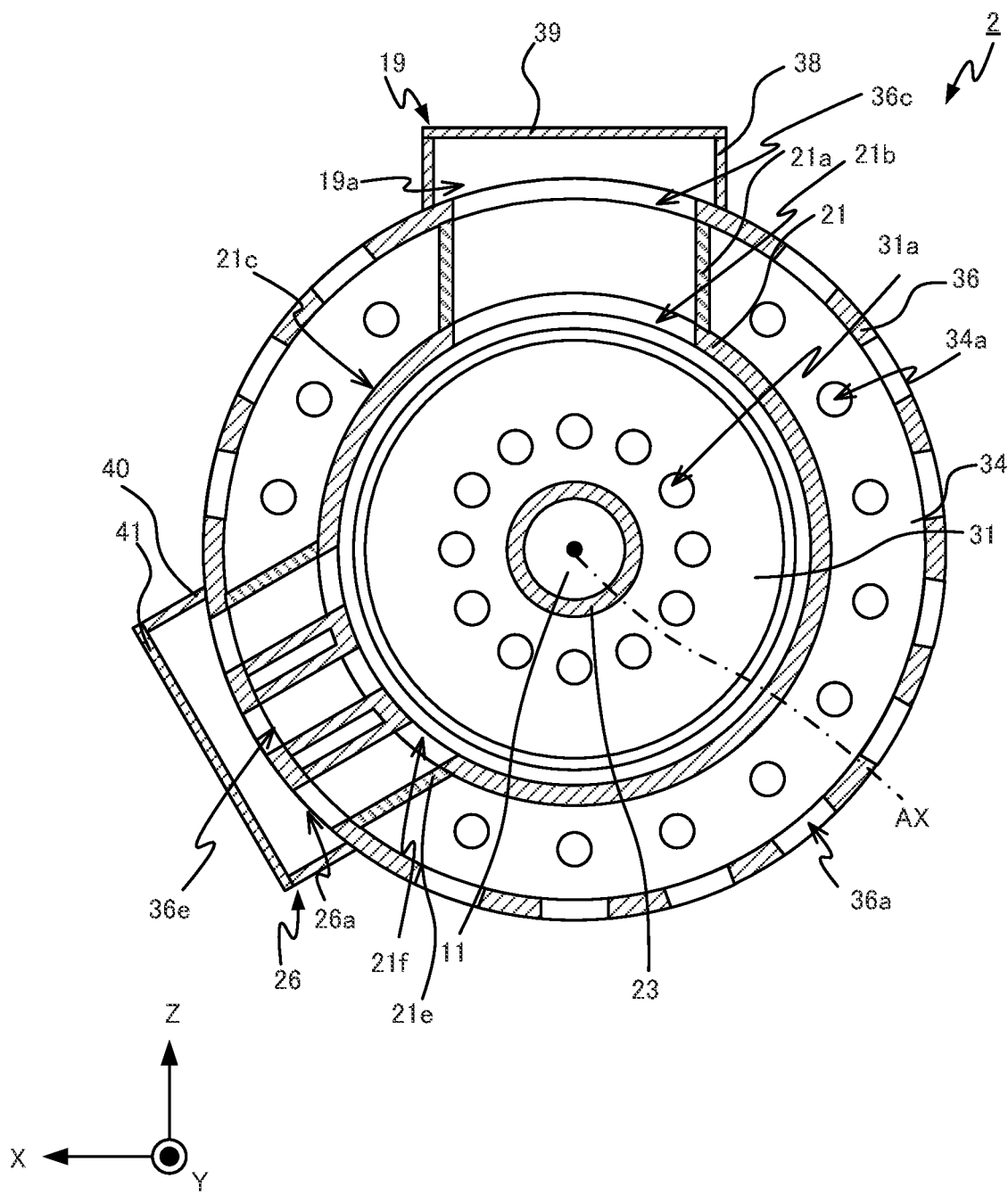
FIG. 10 is a cross-sectional view of the electric motor according to Embodiment 2.
Figure 11:
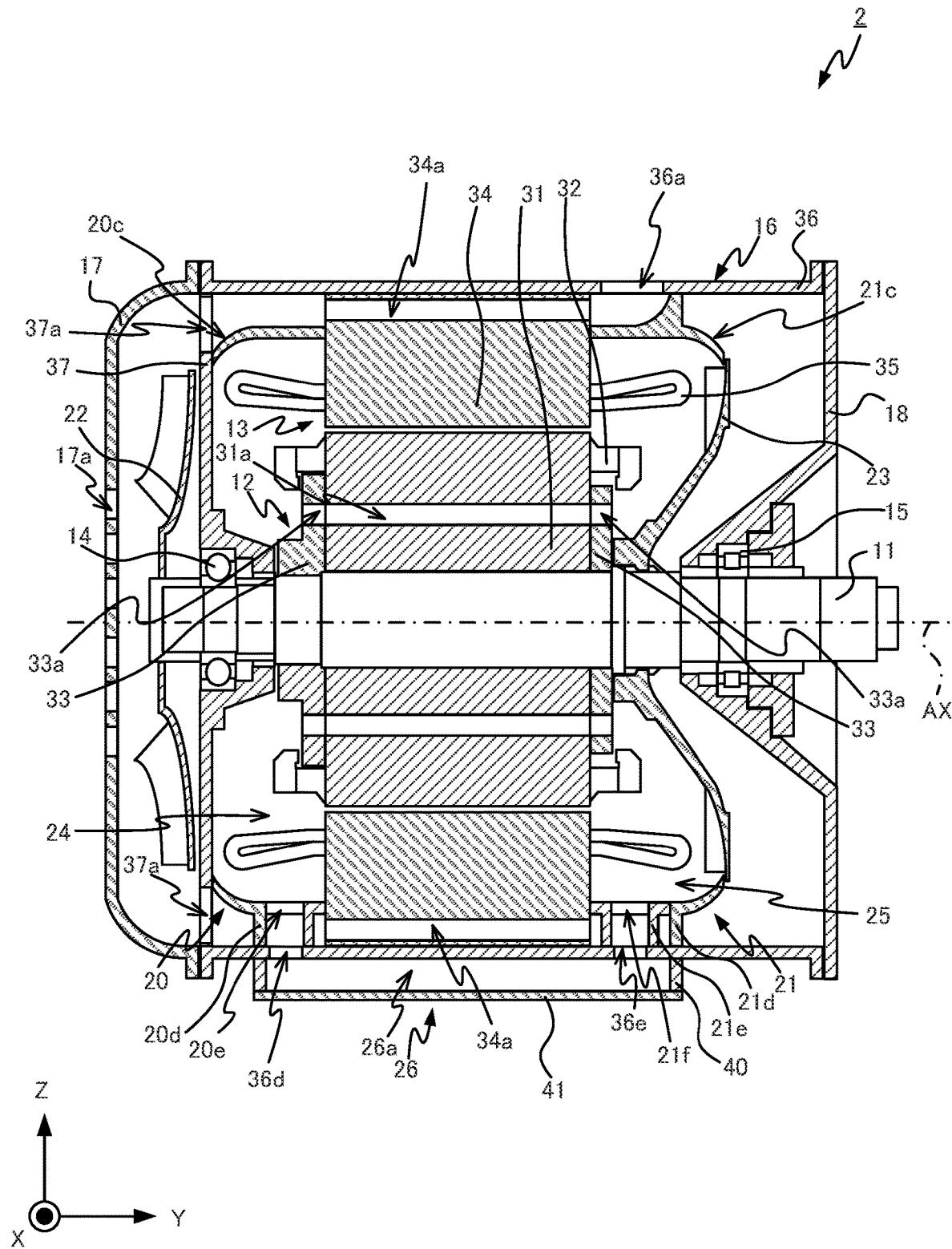
FIG. 11 is a cross-sectional view of the electric motor according to Embodiment 2 taken along line XI-XI as viewed in the direction indicated by the arrows in FIG. 9.

As illustrated in FIGS. 9 and 10, and FIG. 11 that is a cross-sectional view taken along line XI-XI as viewed in the direction indicated by the arrows in FIG. 9, multiple first air holes 36d and multiple second air holes 36e connecting to the internal air bypass 26a are located in the positive X-direction portion of the vertically lower area of the tubular member 36.

The bypass definer 26 defines the internal air bypass 26a located radially outward from the external air passages 34a. More specifically, the bypass definer 26 covers the first air holes 36d and the second air holes 36e to define the internal air bypass 26a with the outer circumferential surface of the frame 16. The bypass definer 26 includes a mount member 40 attached to the outer circumferential surface of the tubular member 36 and a plate member 41 attached to the mount member 40 to define the internal air bypass 26a with the outer circumference of the tubular member 36.

The mount member 40 is hollow and attached to the tubular member 36 with the center axis intersecting with the outer circumferential surface of the tubular member 36. More specifically, the mount member 40 is attached to the tubular member 36 to surround the first air holes 36d and the second air holes 36e. The mount member 40 may be fixed to the tubular member 36 with any method, such as bonding with an adhesive, welding, or fastening with a fastener, that provides firm fixing to maintain the relative positions under vibrations from a traveling railway vehicle.

A space surrounded by the mount member 40, the plate member 41, and the tubular member 36 of the frame 16 is the internal air bypass 26a. The plate member 41 may be formed from a highly thermally conductive material, for example, metal such as copper or aluminum. The plate member 41 of a material with high thermal conductivity transfers heat from the internal air flowing through the internal air bypass 26a to the external air located radially outward from the internal air bypass 26a, thus lowering the temperature of the internal air flowing through the internal air bypass 26a. This increases the cooling performance of the electric motor 2. To further increase the cooling performance of the electric motor 2, the plate member 41 is preferably, for example, a thin plate with a thickness not greater than 6 mm. The plate member 41 being a thin plate more efficiently transfers heat from the internal air flowing through the internal air bypass 26a to the external air located radially outward from the internal air bypass 26a, further lowering the temperature of the internal air. This further increases the cooling performance of the electric motor 2.

The first guide 20 includes multiple hollow first partition walls 20d in the positive X-direction portion of the vertically lower area, in addition to the multiple first partition walls 20a located in the vertically upper area. More specifically, the first guide 20 includes as many first partition walls 20d as the first air holes 36d. In Embodiment 2, the first guide 20 includes three first partition walls 20d circumferentially adjacent to one another. The first partition walls 20d extend from the outer circumferential surface 20c of the first guide 20 including the first tube, and connect the internal air bypass 26a and the internal space 24 inside the first tube.

Figure 12:
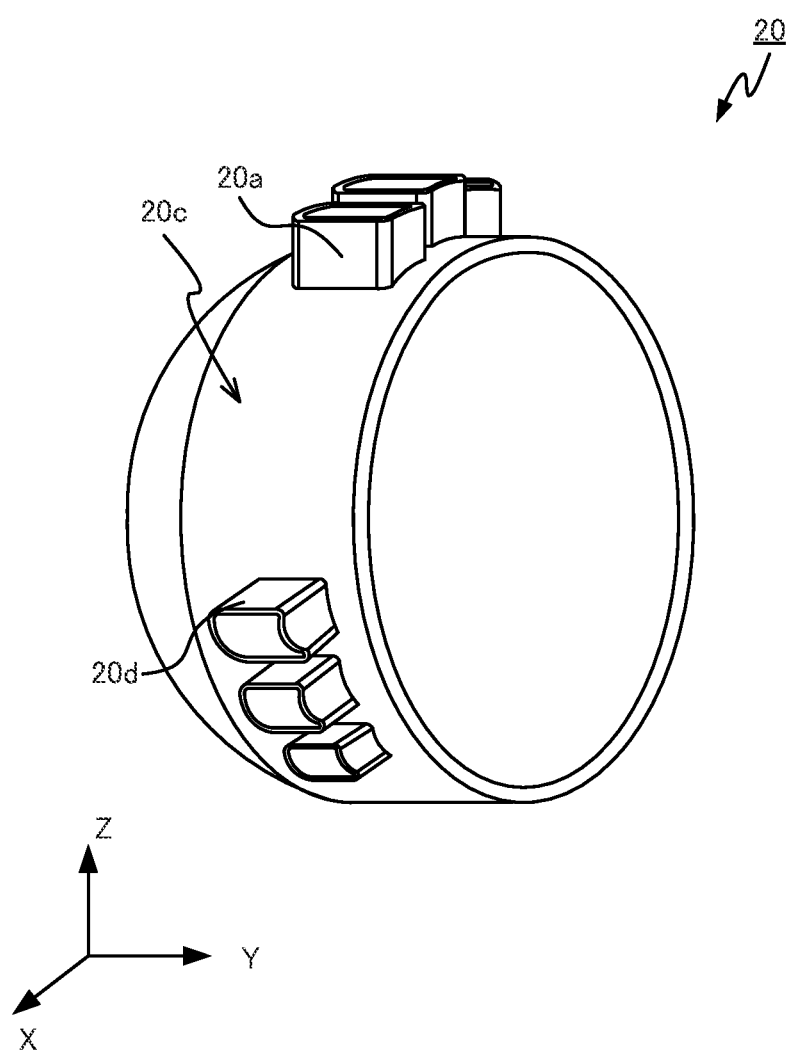
FIG. 12 is a perspective view of a first guide in Embodiment 2.

More specifically, as illustrated in FIG. 12, the first partition walls 20d are located on the outer circumferential surface 20c of the first guide 20, in addition to the first partition walls 20a. As illustrated in FIGS. 9 and 11, in addition to the third air holes 20b, multiple third air holes 20e, or specifically, as many third air holes 20e as the first partition walls 20d radially extend through the outer circumferential surface 20c. The first partition walls 20d are each a hollow rectangular prism similarly to the first partition walls 20a. The inside of each first partition wall 20d connects to the internal air bypass 26a and the internal space 24 inside the first guide 20.

Each first partition wall 20d has one end in contact with the periphery of the corresponding first air hole 36d and the other end in contact with the periphery of the corresponding third air hole 20e in the outer circumferential surface 20c of the first guide 20. This structure reduces the likelihood of the internal air flowing inside the first partition walls 20d mixing with the external air flowing around the first partition walls 20d.

The first guide 20 with the above structure guides the external air flowing in through the inlet holes 17a to the external air passages 34a, and guides the internal air after passing through the internal air bypasses 19a and 26a to the internal space 24. A portion of the external air drawn in through the inlet holes 17a flows through between the adjacent first partition walls 20d into the external air passages 34a, and another portion of the external air drawn in through the inlet holes 17a flows along the first partition walls 20d into the external air passages 34a. The internal air after passing through the internal air bypass 26a flows inside the first partition walls 20d to the internal space 24, and flows into the rotor air passages 31a.

Each first partition wall 20d transfers heat transferred from the internal air flowing inside to the surrounding external air. In other words, heat is transferred through the first partition walls 20d from the internal air flowing inside the first partition walls 20d to the external air flowing through between the adjacent first partition walls 20d or around the first partition walls 20d. Thus, the internal air flowing through the first partition walls 20d is cooled.

To increase the performance of heat transfer from the internal air to the external air, each first partition wall 20d is preferably longer in the direction of extension of the rotation axis AX than in the circumferential direction. The first partition walls 20d are preferably formed from a highly thermally conductive material, for example, metal such as copper or aluminum. The entire first guide 20 may be formed from a highly thermally conductive material.

The second guide 21 includes multiple hollow second partition walls 21e in the positive X-direction portion of the vertically lower area, in addition to the second partition wall 21a located in the vertically upper area. More specifically, the second guide 21 includes as many second partition walls 21e as the second air holes 36e. In Embodiment 2, the second guide 21 includes three second partition walls 21e circumferentially adjacent to one another. The second partition walls 21e extend from the outer circumferential surface 21c of the second guide 21 including the second tube, and connect the internal air bypass 26a and the internal space 25 inside the second tube.

Figure 13:
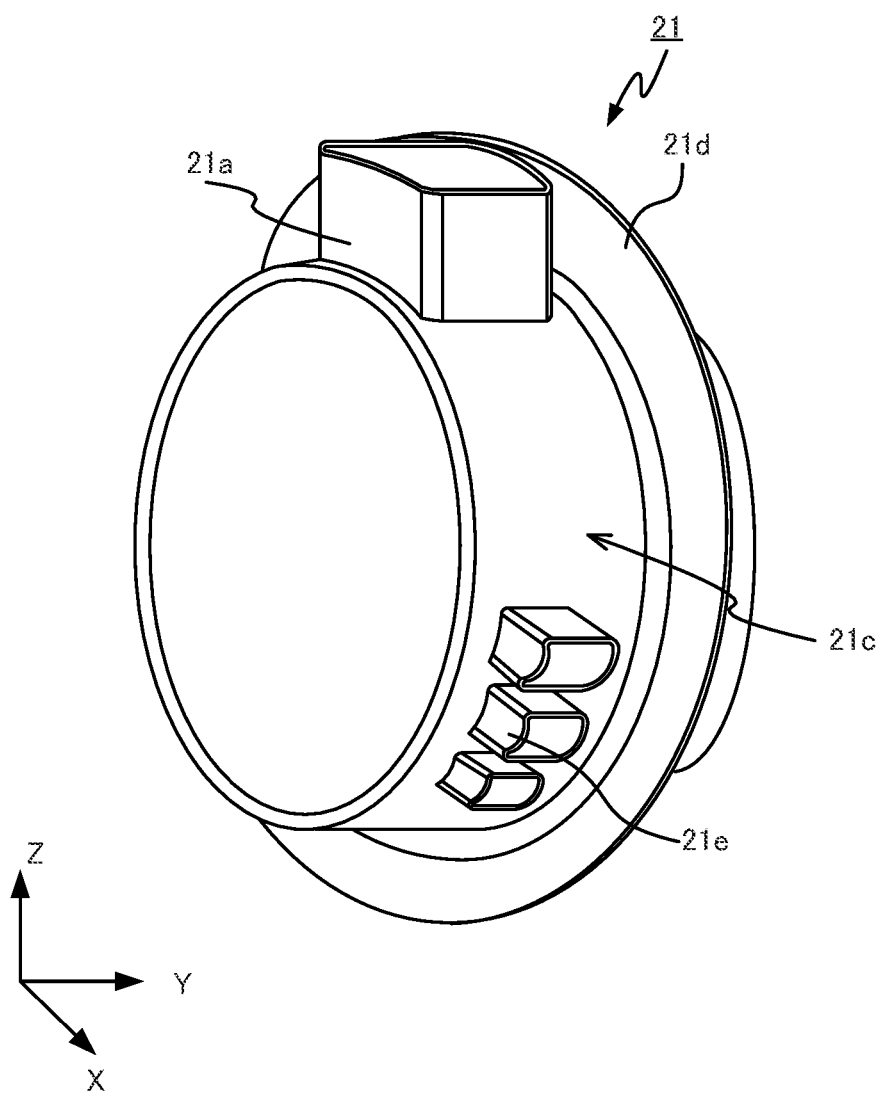
FIG. 13 is a perspective view of a second guide in Embodiment 2.

More specifically, as illustrated in FIG. 13, the second partition walls 21e are located on the outer circumferential surface 21c of the second guide 21, in addition to the second partition walls 21a. As illustrated in FIGS. 10 and 11, in addition to the fourth air hole 21b, multiple fourth air holes 21f, or specifically, as many fourth air holes 21f as the second partition walls 21e radially extend through the outer circumferential surface 21c. The second partition walls 21e are each a hollow rectangular prism similarly to the second partition walls 21a. The inside of each second partition wall 21e connects to the internal air bypass 26a and the internal space 25 inside the second guide 21.

Each second partition wall 21e has one end in contact with the periphery of the corresponding second air hole 36e and the other end in contact with the periphery of the corresponding fourth air hole 21f in the outer circumferential surface 21c of the second guide 21. This structure reduces the likelihood of the internal air flowing inside the second partition walls 21e mixing with the external air flowing around the second partition walls 21e.

The second guide 21 with the above structure guides the external air after passing through the external air passages 34a to the outlet holes 36a, and guides the internal air from the internal space 25 to the internal air bypasses 19a and 26a. A portion of the external air after passing through the external air passages 34a flows through between the adjacent second partition walls 21e and flows out through the outlet holes 36a. Another portion of the external air after passing through the external air passages 34a flows along the second partition walls 21e and flows out through the outlet holes 36a. A portion of the internal air from the internal space 25 flows inside the second partition walls 21e into the internal air bypass 26a.

Each second partition wall 21e transfers heat transferred from the internal air flowing inside to the surrounding external air. In other words, heat is transferred through the second partition walls 21e from the internal air flowing inside the second partition walls 21e to the external air flowing through between the adjacent second partition walls 21e or around the second partition walls 21e. Thus, the internal air flowing through the second partition walls 21e is cooled.

To increase the performance of heat transfer from the internal air to the external air, each second partition wall 21e is preferably longer in the direction of extension of the rotation axis AX than in the circumferential direction. The second partition walls 21e is preferably formed from a highly thermally conductive material, for example, metal such as copper or aluminum. The entire second guide 21 may be formed from a highly thermally conductive material.

Figure 14:
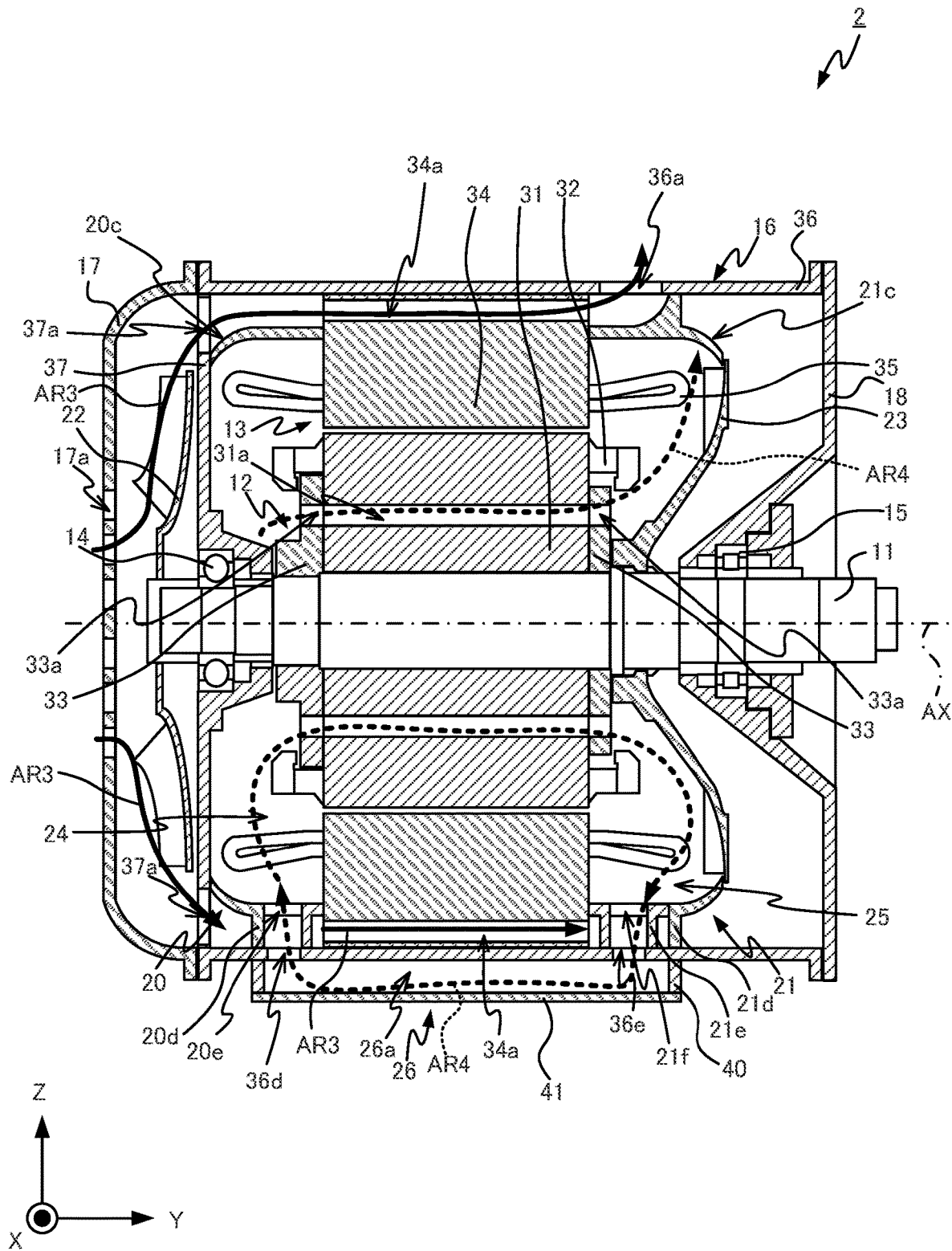
FIG. 14 is a diagram illustrating flow of external air and flow of internal air in the electric motor according to Embodiment 2.

The flow of the external air and the flow of the internal air in the electric motor 2 with the above structure being energized is described below. Airflow along a YZ plane is similar to the airflow in the electric motor 1 illustrated in FIG. 8. The flow of the external air and the flow of the internal air in a cross section including the internal air bypass 26a and the rotation axis AX are illustrated in FIG. 14. When an electric current is fed through the lead wire 51 illustrated in FIG. 8 to the stator coil 35 to energize the electric motor 2, the rotor 12 rotates, and the shaft 11, the outer fan 22, and the inner fan 23 rotate integrally with the rotor 12.

As the outer fan 22 rotates, the external air flows as indicated by solid line arrows AR3 in FIG. 14. More specifically, rotation of the outer fan 22 causes the external air to flow through the inlet holes 17a of the first bracket 17. The external air flowing in through the inlet holes 17a radially flows toward the end-face air holes 37a.

The external air after passing through the end-face air holes 37a located in a positive X-direction portion of an area vertically lower than a horizontal plane including the rotation axis AX flows through between the adjacent first partition walls 20d or around the first partition walls 20d, into the external air passages 34a. Heat is transferred, by the flow of the external air described above, from the internal air flowing inside the first partition walls 20d to the external air, thus cooling the internal air.

Of the external air described above, a portion of the external air after passing through the external air passages 34a located in the positive X-direction portion of the area vertically lower than the horizontal plane including the rotation axis AX flows through between the adjacent second partition walls 21e or around the second partition walls 21e, and then flows out through the outlet holes 36a. Heat is transferred, by the flow of the external air described above, from the internal air flowing inside the second partition walls 21e to the external air, thus cooling the internal air.

As the inner fan 23 rotates, the internal air flows as indicated by dotted-line arrows AR4 in FIG. 14. More specifically, rotation of the inner fan 23 causes the internal air in the internal space 25 inside the second guide 21 to radially flow. The radially-flown internal air flows along the second guide 21 toward the fourth air hole 21b illustrated in FIG. 8 and the fourth air holes 21f illustrated in FIG. 14.

The internal air after passing through the fourth air holes 21f flows into the second partition walls 21e. As described above, heat is transferred from the internal air flowing inside the second partition walls 21e to the external air flowing through between the adjacent second partition walls 21e or around the second partition walls 21e, thus cooling the internal air. The internal air after passing through the second partition walls 21e flows through the second air holes 36e into the internal air bypass 26a. When the internal air flows through the internal air bypass 26a, heat is transferred through the plate member 41 from the internal air to the external air located radially outward from the plate member 41, thus cooling the internal air.

The internal air after passing through the internal air bypass 26a flows through the first air holes 36d into the first partition walls 20d. As described above, heat is transferred from the internal air flowing inside the first partition walls 20d to the external air flowing through between the adjacent first partition walls 20d or around the first partition walls 20d, thus cooling the internal air. The internal air after passing through the first partition walls 20d flows along the first guide 20 toward the through-holes 33a connecting to the rotor air passages 31a.

The internal air then passes successively through the through-holes 33a in one clamp in the pair of clamps 33, the rotor air passages 31a, and the through-holes 33a in the other clamp in the pair of clamps 33, and is directed radially again as the inner fan 23 rotates. As described above, the internal air circulates inside the electric motor 2.

As described above, in addition to the structure of the electric motor 1, the electric motor 2 according to Embodiment 2 includes the bypass definer 26 defining the internal air bypass 26a, the first partition walls 20d connecting the internal air bypass 26a and the internal space 24, and the second partition walls 21e connecting the internal air bypass 26a and the internal space 25. More specifically, heat is transferred from the internal air flowing through the first partition walls 20a and 20d and the second partition walls 21a and 21e to the external air. Transferring heat from the internal air to the external air at more positions than in the electric motor 1 further lowers the internal air temperature. Thus, the cooling performance of the electric motor 2 is higher than the cooling performance of the electric motor 1.

Embodiment 3

The electric motors 1 and 2 according to Embodiments 1 and 2 described above are framed electric motors each including the frame 16, but the electric motors 1 and 2 may be frameless electric motors. An electric motor 3 that is a frameless motor according to Embodiment 3 is described. The electric motor 3 illustrated in FIG. 15 includes no frame 16, but includes a support 42 attached to the inner surface of the first bracket 17 and supporting the bearing 14.

The electric motor 3 is described in detail below, focusing on the differences from the electric motor 1 according to Embodiment 1.

The first bracket 17 and the second bracket 18 are attached to the stator 13 with the stator 13 in between in Y-direction. More specifically, the first bracket 17 and the second bracket 18 each are attached to the stator core 34 at a position radially outward from the external air passages 34a in the stator core 34.

Figure 15:
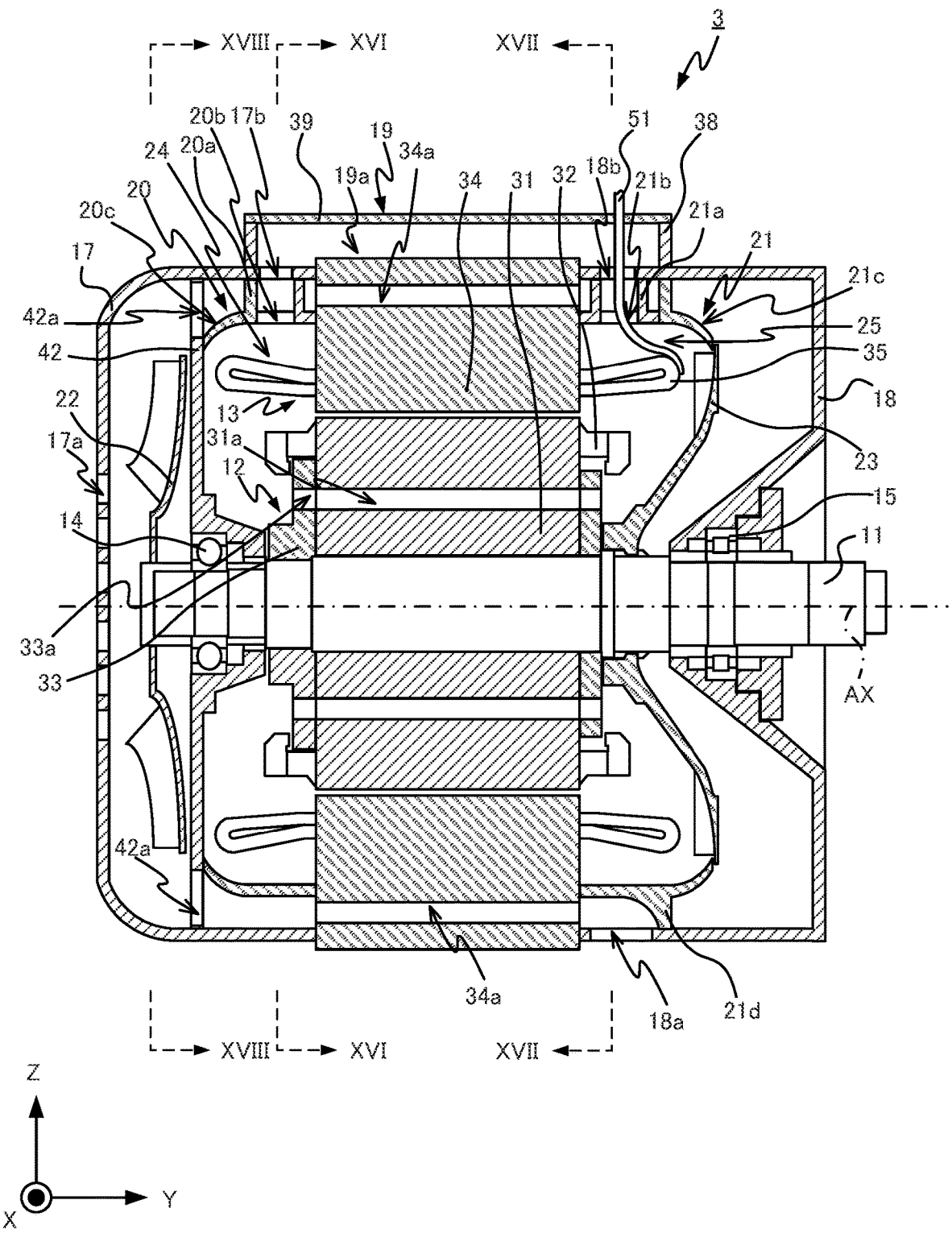
FIG. 15 is a cross-sectional view of an electric motor according to Embodiment 3.
Figure 16:
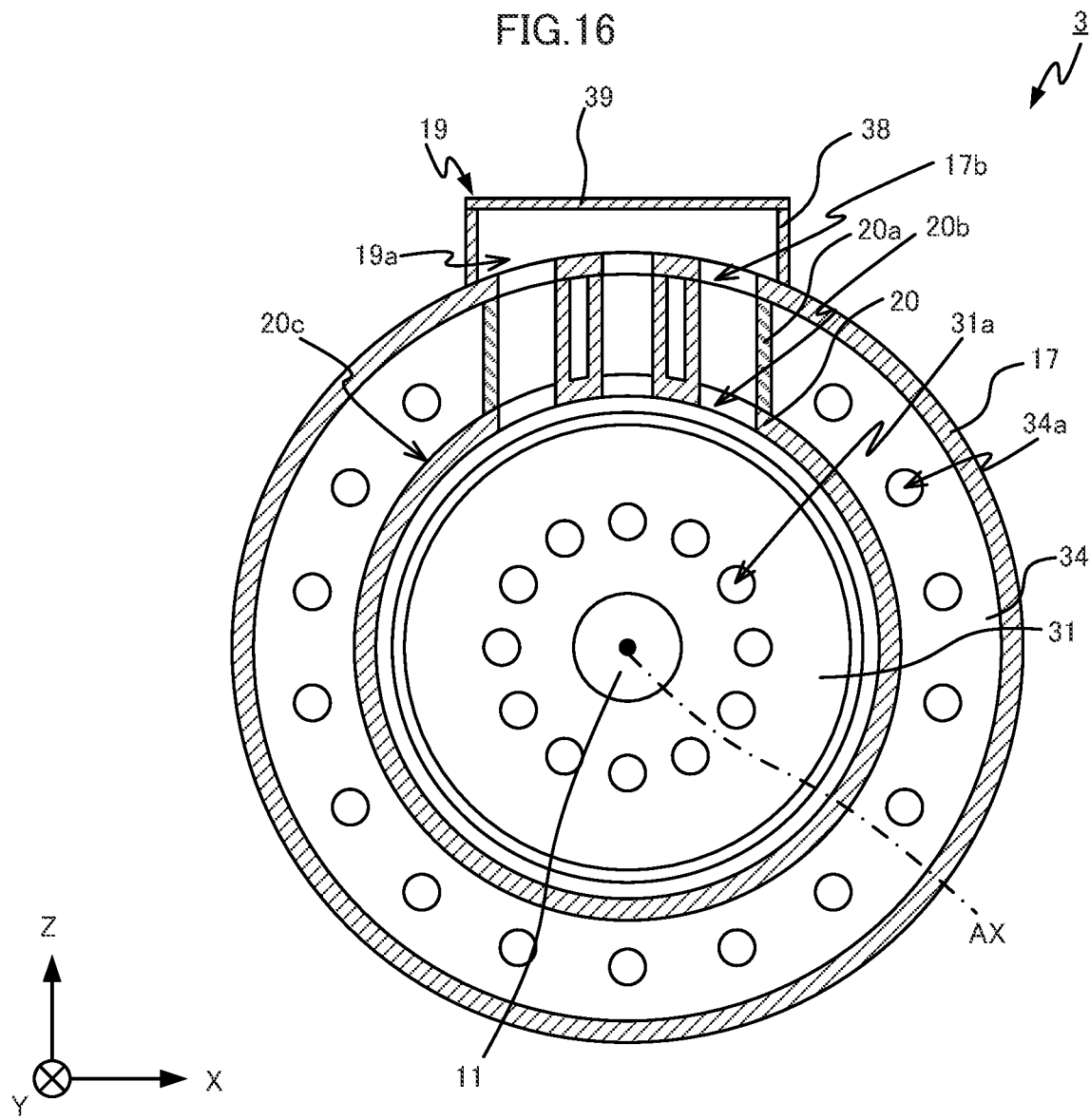
FIG. 16 is a cross-sectional view of the electric motor according to Embodiment 3 taken along line XVI-XVI as viewed in the direction indicated by the arrows in FIG. 15.

As illustrated in FIG. 15 and FIG. 16 that is a cross-sectional view taken along line XVI-XVI as viewed in the direction indicated by the arrows in FIG. 15, multiple first air holes 17b connecting to the internal air bypass 19a are located in a vertically upper area of the first bracket 17. More specifically, the first bracket 17 has as many first air holes 17b as the first partition walls 20a. For ease of illustration, the rotor conductors 32, the clamps 33, and the stator coil 35 are not illustrated in FIG. 16.

Figure 17:
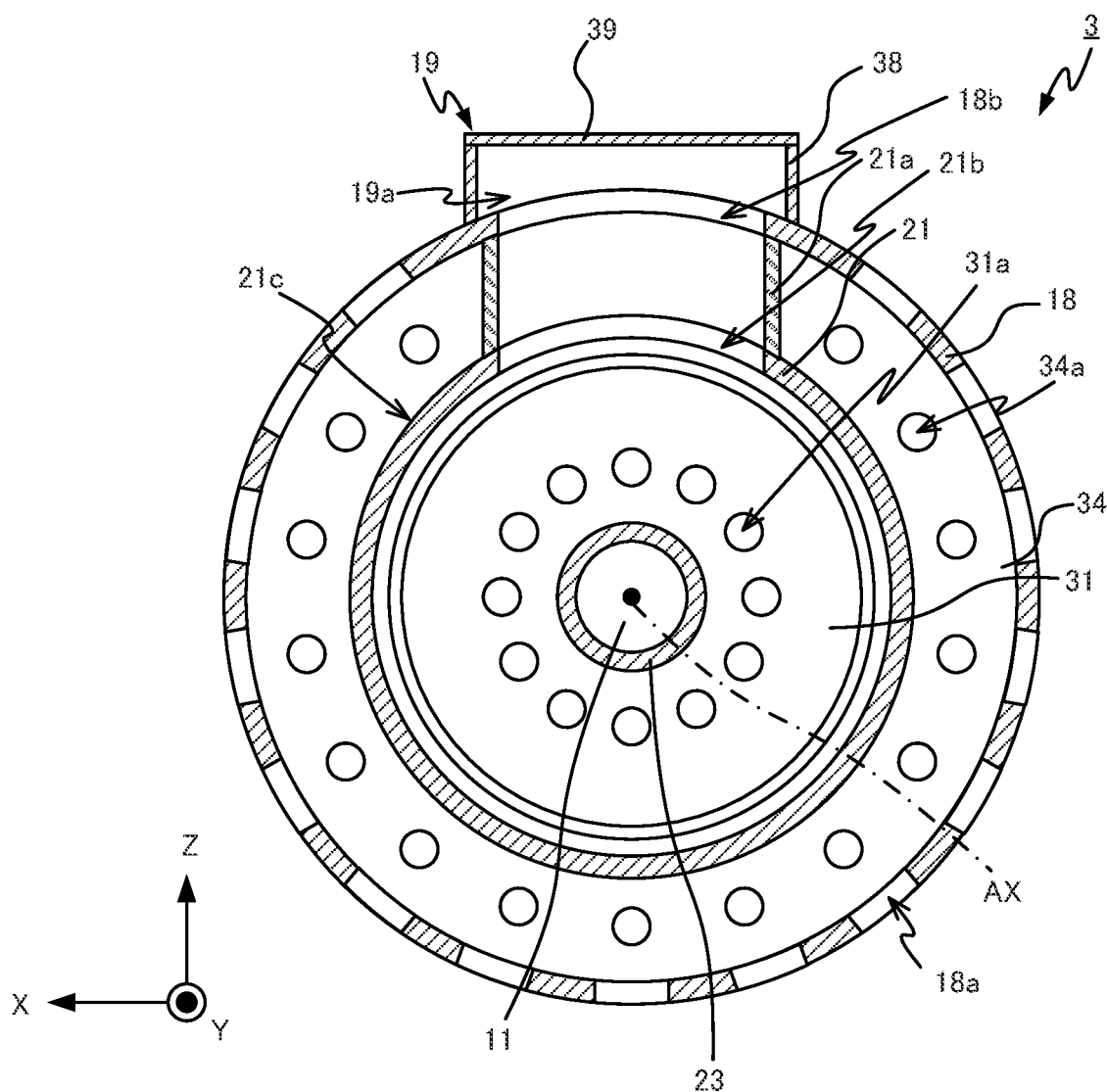
FIG. 17 is a cross-sectional view of the electric motor according to Embodiment 3 taken along line XVII-XVII as viewed in the direction indicated by the arrows in FIG. 15.

As illustrated in FIG. 15, outlet holes 18a are located in an end of the second bracket 18 closer to the stator 13 to discharge the external air after passing through the external air passages 34a. In Embodiment 3, as illustrated in FIG. 17 that is a cross-sectional view taken along line XVII-XVII as viewed in the direction indicated by the arrows in FIG. 15, the second bracket 18 has multiple outlet holes 18a arranged in the circumferential direction except in a vertically upper area. For ease of illustration, the rotor conductors 32, the clamps 33, and the stator coil 35 are not illustrated in FIG.

17. The outlet holes 18a radially extend through the second bracket 18. A second air hole 18b connecting to the internal air bypass 19a is located in the vertically upper area of the second bracket 18.

As illustrated in FIGS. 15, 16, and 17, the bypass definer 19 covers the first air holes 17b and the second air hole 18b to define the internal air bypass 19a with the outer circumferential surfaces of the first bracket 17, the stator core 34, and the second bracket 18. The mount member 38 is attached to the outer circumferential surfaces of the first bracket 17, the stator core 34, and the second bracket 18. More specifically, the mount member 38 is hollow and attached to the first bracket 17, the stator core 34, and the second bracket 18 with the center axis radially extending. More specifically, the mount member 38 is attached to the first bracket 17, the stator core 34, and the second bracket 18 to surround the multiple first air holes 17b and the second air hole 18b.

A space surrounded by the mount member 38, the plate member 39, and the outer circumferential surfaces of the first bracket 17, the stator core 34, and the second bracket 18 is the internal air bypass 19a.

The first guide 20 is accommodated in the first bracket 17 and attached to the first bracket 17 and to the stator core 34 at a position radially inward from the external air passages 34a. The first guide 20 is further attached to the support 42 at one end. The first partition walls 20a in the first guide 20 each connect the internal air bypass 19a and the internal space 24. The internal space 24 is a space surrounded by the first guide 20, the support 42, the rotor 12, and the stator 13.

Each first partition wall 20a has one end in contact with the periphery of the corresponding first air hole 17b and the other end in contact with the periphery of the corresponding third air hole 20b in the outer circumferential surface 20c. This structure reduces the likelihood of the internal air flowing inside the first partition walls 20a mixing with the external air flowing around the first partition walls 20a.

The second guide 21 is accommodated in the second bracket 18 and attached to the second bracket 18 and to the stator core 34 at a position radially inward from the external air passages 34a. The second partition wall 21a included in the second guide 21 connects the internal air bypass 19a and the internal space 25. The internal space 25 is a space surrounded by the second guide 21, the inner fan 23, the rotor 12, and the stator 13.

The second partition wall 21a has one end in contact with the periphery of the second air hole 18b and the other end in contact with the periphery of the fourth air hole 21b in the outer circumferential surface 21c. This structure reduces the likelihood of the internal air flowing inside the second partition wall 21a mixing with the external air flowing around the second partition wall 21a.

Figure 18:
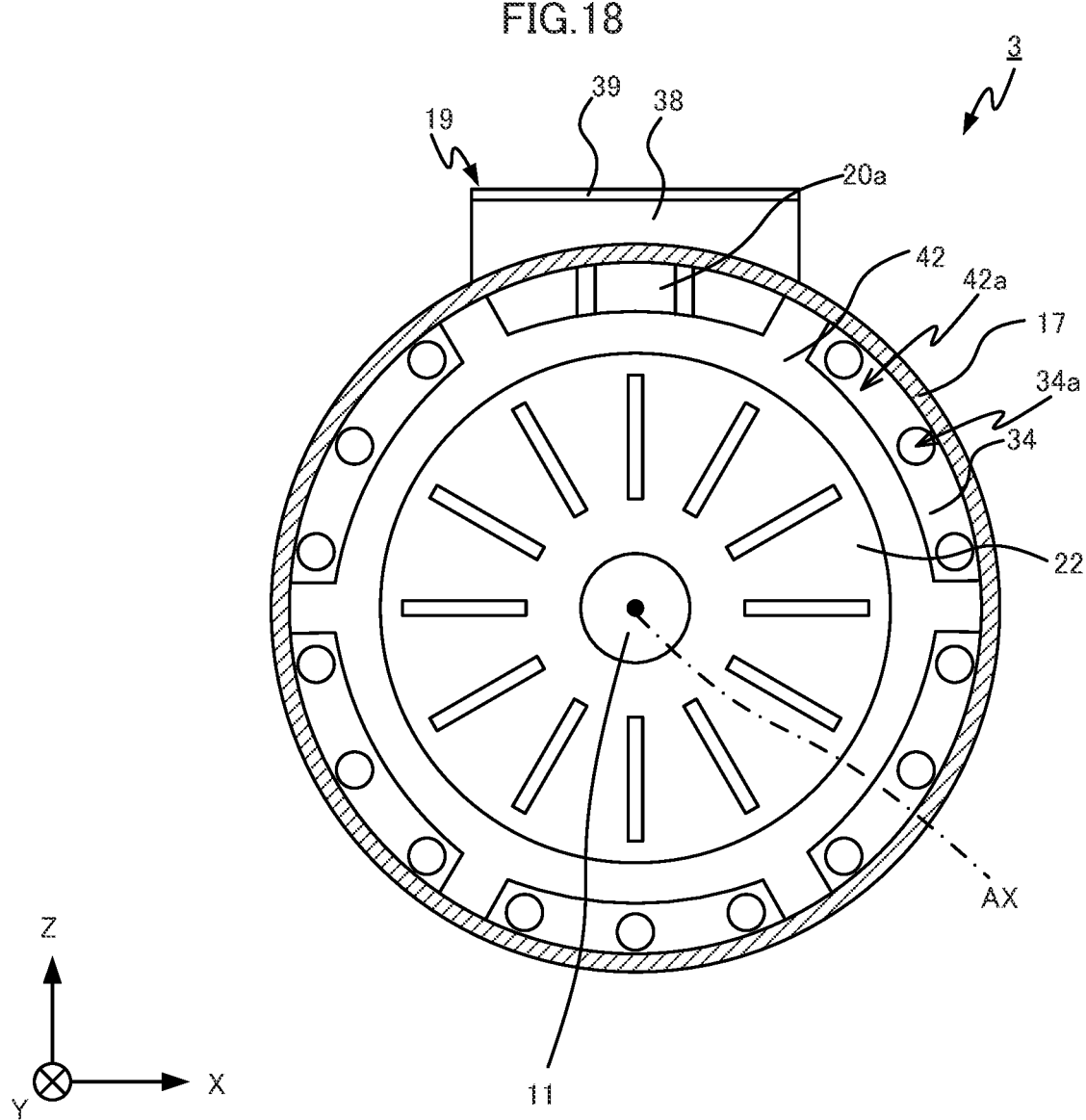
FIG. 18 is a cross-sectional view of the electric motor according to Embodiment 3 taken along line XVIII-XVIII as viewed in the direction indicated by the arrows in FIG. 15.

The support 42 is attached to the first bracket 17 with the outer circumferential surface in contact with the first bracket 17. The support 42 may be fixed to the first bracket 17 with any method, such as bonding with an adhesive, welding, or fastening with a fastener, that provides firm fixing to maintain the relative positions under vibrations from a traveling railway vehicle. As illustrated in FIG. 18 that is a cross-sectional view taken along line XVIII-XVIII as viewed in the direction indicated by the arrows in FIG. 15, the support 42 has end-face air holes 42a arranged in the circumferential direction. The end-face air holes 42a extend through the support 42 in Y-direction. In Embodiment 3, the support 42 has six end-face air holes 42a.

The flow of the external air and the flow of the internal air in the electric motor 3 with the above structure being energized is described below with reference to FIG. 19.

When an electric current is fed through the lead wire 51 to the stator coil 35 to supply power to the electric motor 3, the rotor 12 rotates, and the shaft 11, the outer fan 22, and the inner fan 23 rotate integrally with the rotor 12.

Figure 19:
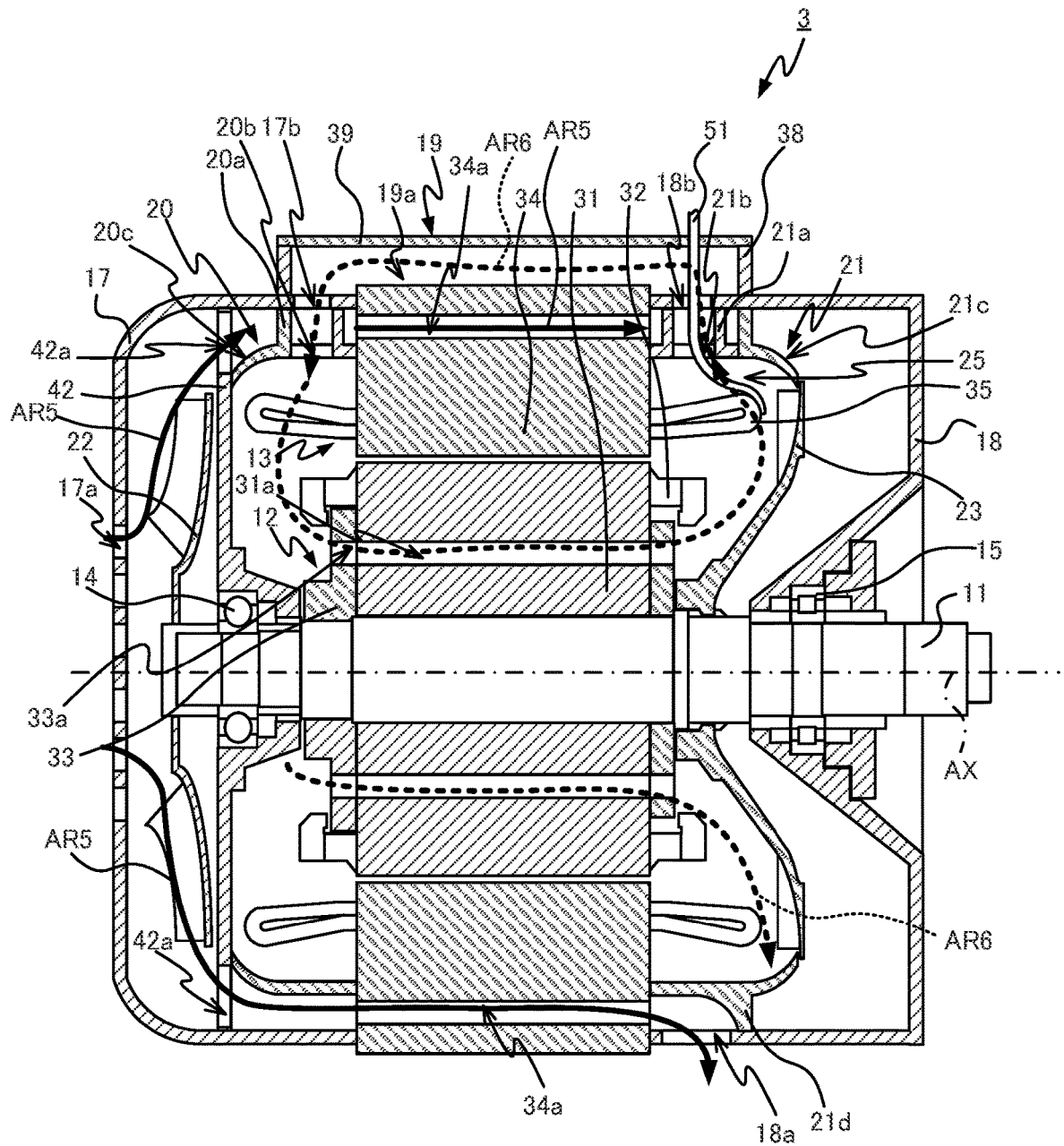
FIG. 19 is a diagram illustrating flow of external air and flow of internal air in the electric motor according to Embodiment 3.

As the outer fan 22 rotates, the external air flows as indicated by solid line arrows AR5 in FIG. 19. More specifically, rotation of the outer fan 22 causes the external air to flow through the inlet holes 17a of the first bracket 17. The external air flowing in through the inlet holes 17a radially flows toward the end-face air holes 42a.

The external air after passing through the end-face air holes 42a flows along the first guide 20 toward the external air passages 34a and flows into the external air passages 34a. The external air after passing through the end-face air holes 42a in the vertically upper area flows through between the adjacent first partition walls 20a or around the first partition walls 20a, into the external air passages 34a. Heat is transferred, by the flow of the external air described above, from the internal air flowing inside the first partition walls 20a to the external air, thus cooling the internal air.

When the external air flows through the external air passages 34a, heat is transferred from the stator 13 to the external air, thus cooling the stator 13. The external air after passing through the external air passages 34a flows along the second guide 21 and flows out through the outlet holes 18a. Of the external air described above, a portion of the external air after passing through the external air passages 34a located in the vertically upper area flows along the second partition wall 21a and then along the second guide 21, and flows out through the outlet holes 18a. Heat is transferred, by the flow of the external air described above, from the internal air flowing inside the second partition wall 21a to the external air, thus cooling the internal air.

As the inner fan 23 rotates, the internal air flows as indicated by dotted-line arrows AR6 in FIG. 19. More specifically, rotation of the inner fan 23 causes the internal air in the internal space 25 inside the second guide 21 to radially flow. The radially-flown internal air flows along the second guide 21 toward the fourth air hole 21b.

The air after passing through the fourth air hole 21b flows into the second partition wall 21a. As described above, heat is transferred from the internal air flowing inside the second partition wall 21a to the external air flowing along the second partition wall 21a, thus cooling the internal air. The internal air after passing through the second partition wall 21a flows through the second air hole 18b into the internal air bypass 19a. When the internal air flows through the internal air bypass 19a, heat is transferred through the plate member 39 from the internal air to the external air located radially outward from the plate member 39, thus cooling the internal air.

The internal air after passing through the internal air bypass 19a flows through the first air holes 17b into the first partition walls 20a. As described above, heat is transferred from the internal air flowing inside the first partition walls 20a to the external air flowing through between the adjacent first partition walls 20a or around the first partition walls 20a, thus cooling the internal air. The internal air after passing through the first partition walls 20a flows along the first guide 20 toward the through-holes 33a connecting to the rotor air passages 31a.

The internal air then passes successively through the through-holes 33a in one clamp in the pair of clamps 33, the rotor air passages 31a, and the through-holes 33a in the other clamp in the pair of clamps 33, and is directed radially again as the inner fan 23 rotates. As described above, the internal air circulates inside the electric motor 3.

As described above, the electric motor 3 according to Embodiment 3 includes the first partition walls 20*a* and the second partition wall 21*a* to transfer heat from the internal air to the external air. More specifically, heat is transferred from the internal air passing through the first partition walls 20*a* to the external air flowing through between the adjacent first partition walls 20*a* or along the first partition walls 20*a*, as well as from the internal air passing through the second partition wall 21*a* to the external air flowing along the second partition wall 21*a*. This cools the internal air to improve the cooling performance of the electric motor 3 that is a frameless motor without increasing the size of the outer fan 22 and the inner fan 23. In other words, the electric motor 3 has high motor efficiency and high cooling performance.

The present disclosure is not limited to the above embodiments.

The positions of the bypass definers 19 and 26 are not limited to the above examples. The positions of the bypass definers 19 and 26 may be determined as appropriate for, for example, space limitations for installing the electric motor 1, 2, or 3 under a railway vehicle floor or the position that allows routing of the lead wire 51. The electric motor 2 may include the bypass definer 26 alone.

The first guide 20 may have any shape to guide the external air drawn in through the inlet holes 17*a* into the external air passages 34*a* to transfer heat from the internal air to the external air. In one example, the first guide 20 may have a polygonal cross section orthogonal to Y-direction, rather than a circular cross section. In another example, the first guide 20 may have circular third air holes 20*b* in the outer circumferential surface 20*c*.

The first partition walls 20*a* and 20*d* may each have any shape other than a hollow rectangular prism to connect the internal air bypass 19*a* or 26*a* and the internal space 24. More specifically, the first partition walls 20*a* and 20*d* may each have any shape in a cross section orthogonal to the direction in which the hole in the first partition wall 20*a* or 20*d* extends, rather than a rectangular cross section. For example, the first partition walls 20*a* and 20*d* may each have a circular, elliptical, or polygonal cross section. In the embodiments described above, the first partition walls 20*a* are equally spaced, but the first partition walls 20*a* may be unequally spaced. The same applies to the first partition walls 20*d*.

The second guide 21 may have any shape to guide the external air after passing through the external air passages 34*a* outside and allow heat from the internal air to be transferred to the external air. In one example, the second guide 21 may have a polygonal cross section orthogonal to Y-direction, rather than a circular cross section.

The second partition walls 21*a* and 21*e* may each have any shape other than a hollow rectangular prism to connect the internal air bypass 19*a* or 26*a* and the internal space 25. More specifically, the second partition walls 21*a* and 21*e* may each have any shape in a cross section orthogonal to the direction in which the hole in the second partition wall 21*a* or 21*e* extends, rather than a rectangular shape. For example, the second partition walls 21*a* and 21*e* may each have a circular, elliptical, or polygonal cross section. In the embodiments described above, the second partition walls 21*e* are equally spaced, but the second partition walls 21*e* may be unequally spaced.

To increase the cooling performance of the electric motors 1 and 2, the second bracket 18 facing the inner fan 23 may have inlet holes, and the tubular member 36 may have multiple outlet holes at the end closer to the second bracket 18. These outlet holes are aligned in the circumferential direction at positions closer to the second bracket 18 than the outlet holes 36*a*. In this case, the inner fan 23 preferably includes multiple blades on a surface facing the second bracket 18. Thus, as the inner fan 23 rotates, the air drawn in through the inlet holes in the second bracket 18 radially flows to flow out through the outlet holes in the tubular member 36. Thus, heat is transferred from the internal air to the external air through the inner fan 23, increasing the cooling performance of the electric motor 1 or 2. Similarly, the electric motor 3 may include inlet holes and outlet holes in the second bracket 18.

In this case, the outer edge of the inner fan 23 preferably defines a labyrinth channel with the second guide 21. The labyrinth channel reduces contaminants, such as dust and water drops, in the external air drawn in through the inlet holes in the second bracket 18 accumulating on the rotor conductors 32 and the stator coil 35.

Figure 20:
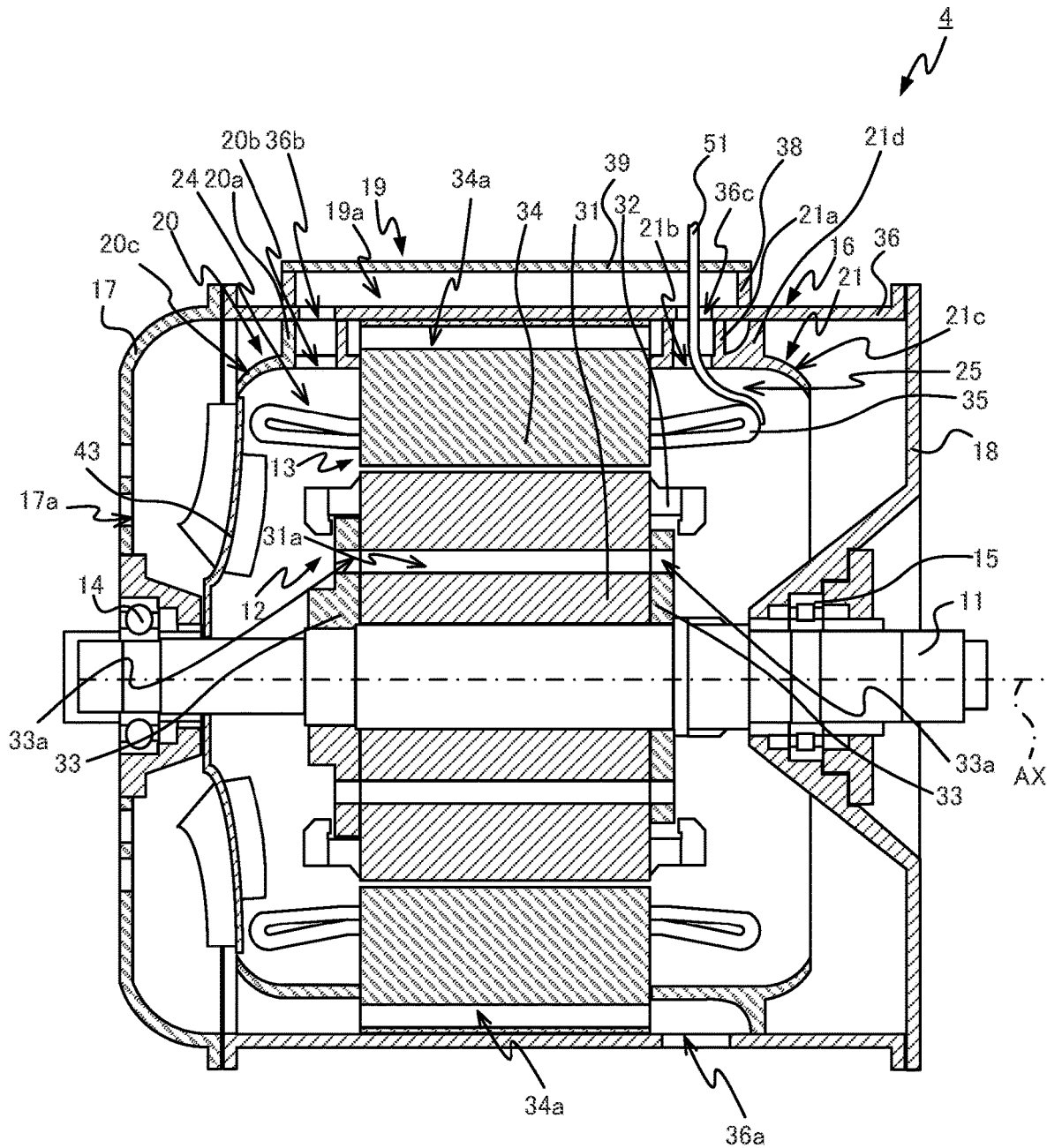
FIG. 20 is a cross-sectional view of an electric motor according to a first modification of an embodiment.

The outer fan 22 and the inner fan 23 may each be a single fan with multiple blades on both sides. FIG. 20 illustrates an electric motor 4 including a fan 43 with multiple blades on both sides. In this case, the frame 16 includes the tubular member 36 alone. The first bracket 17 supports the bearing 14, and the outer edge of the fan 43 and the first guide 20 are adjacent to each other to define a labyrinth channel. The first guide 20 may be attached to the tubular member 36 with, for example, a mount member similar to the annular mount 21*d* on the second guide 21. In this case, the mount member attaching the first guide 20 to the tubular member 36 has a through-hole to allow the external air to flow through.

In the electric motor 4, the flow of the external air is the same as or similar to the flow of the external air in the electric motor 1, but the flow of the internal air is different from the flow of the internal air in the electric motor 1. The flow of the internal air different from that in the electric motor 1 is described below. As the fan 43 rotates, air in the internal space 24 inside the first guide 20 radially flows through the third air holes 20*b* into the first partition walls 20*a*, and then flows through the first partition walls 20*a* and through the first air holes 36*b* into the internal air bypass 19*a*.

The air after passing through the internal air bypass 19*a* flows through the second air hole 36*c* into the second partition wall 21*a*, and flows through the second partition wall 21*a* into the internal space 25 inside the second guide 21 through the fourth air hole 21*b*. The internal air passes successively through the through-holes 33*a* in one clamp in the pair of clamps 33, the rotor air passages 31*a*, and the through-holes 33*a* in the other clamp in the pair of clamps 33, and then is directed radially again as the fan 43 rotates. As described above, the internal air circulates inside the electric motor 4.

The outer fan 22 may be eliminated when a blower is used to blow in external air through the inlet holes 17*a*.

The rotor core 31 may not include the rotor air passages 31*a*. In this case, the internal air circulates through a space between the rotor 12 and the stator 13 after passing through the internal air bypass 19*a*.

The number of external air passages 34*a* is not limited to the above examples but may be any number. The external air passages 34*a* may each have a cross section other than a circular cross section. In one example, the external air passages 34*a* may each have an elliptical cross section. The external air passages 34*a* may extend in a direction parallel to the rotation axis AX, or in a direction intersecting with the rotation axis AX.

The end-face air holes 37a and 42a may each have a cross section other than a circular cross section. For example, the end-face air holes 37a and 42a may each have an elliptical cross section.

Figure 21:
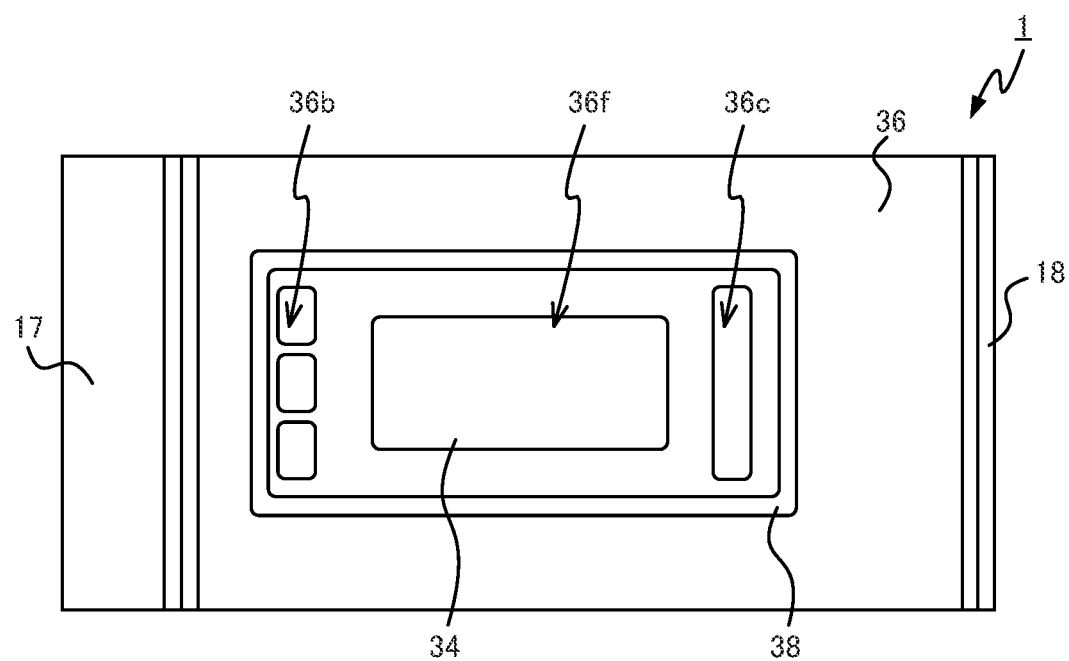
FIG. 21 is a top view of an electric motor according to a second modification of an embodiment.

As illustrated in FIG. 21 that is a top view of the electric motor 1, the tubular member 36 of the electric motor 1 may have an opening 36f in an area facing the internal air bypass 19a. The plate member 39 is not illustrated in FIG. 21. More specifically, the opening 36f is located between the first air holes 36b and the second air hole 36c in the area surrounded by the mount member 38, and radially extends through the tubular member 36. The bypass definer 19 covers the first air holes 36b, the second air hole 36c, and the opening 36f to define the internal air bypass 19a. The stator core 34 is exposed to the internal air bypass 19a through the opening 36f This allows heat generated in the stator core 34 to be transferred directly to the internal air flowing through the internal air bypass 19a, thus cooling the stator core 34 more effectively. The same applies to the electric motors 2 and 4. In the electric motor 2 as well, the tubular member 36 may have an opening 36f in an area facing the internal air bypass 26a.

The tubular member 36 of the electric motors 1, 2, and 4 may include multiple fins with the main surfaces parallel to an XZ plane in an area facing the internal air bypass 19a. The structure with the multiple fins in the internal air bypass 19a allows internal air to flow smoothly, thus improving cooling performance.

The radially inner main surface of the plate member 39 or 41 and the radially outer main surface of the plate member 39 may include multiple fins with the main surfaces parallel to an XZ plane. The radially outer main surface of the plate member 41 may include multiple fins with the main surfaces parallel to a direction in which wind travels. These fins may be formed integrally with the plate member 39 or 41. The structure with the multiple fins on the radially inner surface of the plate member 39 or 41 allows internal air to flow smoothly, thus improving cooling performance. The structure with the multiple fins on the radially outer surface of the plate member 39 or 41 allows heat to be easily transferred from the fins to the external air, thus improving cooling performance.

The plate member 39 and the mount member 38 may be formed integrally with each other. Similarly, the plate member 41 and the mount member 40 may be integral with each other. The mount member 38 or 40 may be integral with the tubular member 36.

The electric motors 1 to 4 are not limited to electric motors for driving a railway vehicle, but may be any totally enclosed electric motor in which components are cooled by flowing internal air and external air. In one example, the electric motors 1 to 4 may be mounted on automobiles, aircraft, or vessels.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3, 4 Electric motor
11 Shaft
12 Rotor
13 Stator
14, 15 Bearing
16 Frame
17 First bracket
17a Inlet hole
17b, 36b, 36d First air hole
18 Second bracket
18a, 36a Outlet hole
18b, 36c, 36e Second air hole
19, 26 Bypass definer
19a, 26a Internal air bypass
20 First guide
20a, 20d First partition wall
20b, 20e Third air hole
20c, 21c Outer circumferential surface
21 Second guide
21a, 21e Second partition wall
21b, 21f Fourth air hole
21d Mount
22 Outer fan
23 Inner fan
24, 25 Internal space
31 Rotor core
31a Rotor air passage
32 Rotor conductor
33 Clamp
33a Through-hole
34 Stator core
34a External air passage
35 Stator coil
36 Tubular member
36f Opening
37 Plate
37a, 42a End-face air hole
38, 40 Mount member
39, 41 Plate member
42 Support
43 Fan
51 Lead wire
AR1, AR2, AR3, AR4, AR5, AR6 Arrow
AX Rotation axis

The invention claimed is:

1. An electric motor, comprising:
a shaft supported rotatably about a rotation axis;
a rotor located radially outward from the shaft and rotatable integrally with the shaft;
a stator radially opposing the rotor with a space therebetween, the stator including an external air passage, the external air passage being a through-hole open at both ends in a direction of extension of the rotation axis;
a first bracket having an inlet hole that allows external air to flow into;
a second bracket opposing the first bracket in the direction of extension of the rotation axis with the rotor and the stator being located between the first bracket and the second bracket;
a bypass definer defining an internal air bypass located radially outward from the stator for internal air to flow through;
a first guide including a first tube and a plurality of first partition walls, the first tube being located between the first bracket and the stator, the plurality of first partition walls being hollow, extending from an outer circumferential surface of the first tube, and connecting the internal air bypass and an internal space of the first tube, the first guide being configured to transfer heat transferred from the internal air passing through inside the plurality of first partition walls to the external air drawn in through the inlet hole and guide the external air to the external air passage;

a second guide including a second tube and a second partition wall, the second tube being located between the second bracket and the stator, the second partition wall being hollow, extending from an outer circumferential surface of the second tube, and connecting the internal air bypass and an internal space of the second tube, the second guide being configured to transfer heat transferred from the internal air passing through inside the second partition wall to the external air after passing through the external air passage and guide the external air outside; and a frame being tubular and accommodating the shaft, the rotor, and the stator, wherein the plurality of first partition walls are located circumferentially adjacent to one another, the external air has a portion flowing through spaces between the plurality of first partition walls and being guided to the external air passage, the frame has an outlet hole to discharge the external air, and the second guide guides the external air after passing through the external air passage to the outlet hole.

2. The electric motor according to claim 1, wherein the first guide guides the internal air after passing through the internal air bypass to the internal space of the first guide through inside the plurality of first partition walls, and the second guide guides the internal air from the internal space of the second guide to the internal air bypass through inside the second partition wall.

3. The electric motor according to claim 2, further comprising:

an inner fan attached to the shaft at a position between the second bracket and the stator with an outer edge of the inner fan adjacent to the second guide, the inner fan being rotatable integrally with the shaft.

4. The electric motor according to claim 1, wherein the first guide guides the internal air from the internal space of the first guide to the internal air bypass through inside the plurality of first partition walls, and the second guide guides the internal air after passing through the internal air bypass to the internal space of the second guide through inside the second partition wall.

5. The electric motor according to claim 4, further comprising:

an inner fan attached to the shaft at a position between the first bracket and the stator with an outer edge of the inner fan adjacent to the first guide, the inner fan being rotatable integrally with the shaft.

6. The electric motor according to claim 1, further comprising:

an outer fan attached to the shaft at a position between the first bracket and the first guide, the outer fan being rotatable integrally with the shaft.

7. The electric motor according to claim 1, wherein the rotor includes a rotor air passage being a through-hole open at both ends in the direction of extension of the rotation axis.

8. The electric motor according to claim 1, wherein the electric motor comprises a plurality of the bypass definers each defining the internal air bypass, each of the plurality of bypass definers connects to the plurality of first partition walls, and each of the plurality of bypass definers connects to the second partition wall.

9. The electric motor according to claim 1, wherein the stator has an outer circumferential surface in contact with an inner circumferential surface of the frame, and the first bracket and the second bracket are attached to the frame in the direction of extension of the rotation axis with the frame being located between the first bracket and the second bracket.

10. The electric motor according to claim 9, wherein the frame includes a tubular member having a tubular shape and a plate covering one end of the tubular member, and the plate has an end-face air hole, the tubular member has a plurality of first air holes connecting to the internal air bypass, the first guide is accommodated in the frame and attached to the plate at a position radially inward from the end-face air hole and to the stator at a position radially inward from the external air passage, and the plurality of first partition walls each connect the internal air bypass and the internal space of the first guide through a corresponding first air hole of the plurality of first air holes.

11. The electric motor according to claim 10, wherein the tubular member has a second air hole connecting to the internal air bypass, the second guide is accommodated in the frame and attached to the stator at a position radially inward from the external air passage and to the tubular member, and the second partition wall connects the internal air bypass and the internal space of the second guide through the second air hole.

12. The electric motor according to claim 1, wherein the first bracket and the second bracket are attached to the stator at a position radially outward from the external air passage, the second bracket has an outlet hole to discharge the external air after passing through the external air passage, and the second guide guides the external air after passing through the external air passage to the outlet hole.

13. An electric motor, comprising:

a shaft supported rotatably about a rotation axis;

a rotor located radially outward from the shaft and rotatable integrally with the shaft;

a stator radially opposing the rotor with a space therebetween, the stator including an external air passage, the external air passage being a through-hole open at both ends in a direction of extension of the rotation axis;

a first bracket having an inlet hole that allows external air to flow into;

a second bracket opposing the first bracket in the direction of extension of the rotation axis with the rotor and the stator being located between the first bracket and the second bracket;

a bypass definer defining an internal air bypass located radially outward from the stator for internal air to flow through;

a first guide including a first tube and a plurality of first partition walls, the first tube being located between the first bracket and the stator, the plurality of first partition walls being hollow, extending from an outer circumferential surface of the first tube, and connecting the internal air bypass and an internal space of the first tube, the first guide being configured to transfer heat transferred from the internal air passing through inside the plurality of first partition walls to the external air drawn in through the inlet hole and guide the external air to the external air passage;

a second guide including a second tube and a second partition wall, the second tube being located between the second bracket and the stator, the second partition wall being hollow, extending from an outer circumferential surface of the second tube, and connecting the internal air bypass and an internal space of the second tube, the second guide being configured to transfer heat transferred from the internal air passing through inside the second partition wall to the external air after passing through the external air passage and guide the external air outside; and a frame being tubular and accommodating the shaft, the rotor, and the stator, wherein the stator has an outer circumferential surface in contact with an inner circumferential surface of the frame, the first bracket and the second bracket are attached to the frame in the direction of extension of the rotation axis with the frame being located between the first bracket and the second bracket, the frame has an outlet hole to discharge the external air, the second guide guides the external air after passing through the external air passage to the outlet hole, the frame includes a tubular member having a tubular shape and a plate covering one end of the tubular member, and the plate has an end-face air hole, the tubular member has a plurality of first air holes connecting to the internal air bypass, the first guide is accommodated in the frame and attached to the plate at a position radially inward from the end-face air hole and to the stator at a position radially inward from the external air passage, and the plurality of first partition walls each connect the internal air bypass and the internal space of the first guide through a corresponding first air hole of the plurality of first air holes.

14. The electric motor according to claim 13, wherein the tubular member has a second air hole connecting to the internal air bypass, the second guide is accommodated in the frame and attached to the stator at a position radially inward from the external air passage and to the tubular member, and the second partition wall connects the internal air bypass and the internal space of the second guide through the second air hole.

15. The electric motor according to claim 14, wherein the bypass definer is attached to the outer circumferential surface of the frame, covers the first air hole and the second air hole, and defines the internal air bypass with the outer circumferential surface of the frame.

16. The electric motor according to claim 15, wherein the frame has an opening in an area facing the internal air bypass, and the stator is exposed to the internal air bypass through the opening.

17. An electric motor, comprising:

a shaft supported rotatably about a rotation axis;

a rotor located radially outward from the shaft and rotatable integrally with the shaft;

a stator radially opposing the rotor with a space therebetween, the stator including an external air passage, the external air passage being a through-hole open at both ends in a direction of extension of the rotation axis;

a first bracket having an inlet hole that allows external air to flow into;

a second bracket opposing the first bracket in the direction of extension of the rotation axis with the rotor and the stator being located between the first bracket and the second bracket;

a bypass definer defining an internal air bypass located radially outward from the stator for internal air to flow through;

a first guide including a first tube and a plurality of first partition walls, the first tube being located between the first bracket and the stator, the plurality of first partition walls being hollow, extending from an outer circumferential surface of the first tube, and connecting the internal air bypass and an internal space of the first tube, the first guide being configured to transfer heat transferred from the internal air passing through inside the plurality of first partition walls to the external air drawn in through the inlet hole and guide the external air to the external air passage; and a second guide including a second tube and a second partition wall, the second tube being located between the second bracket and the stator, the second partition wall being hollow, extending from an outer circumferential surface of the second tube, and connecting the internal air bypass and an internal space of the second tube, the second guide being configured to transfer heat transferred from the internal air passing through inside the second partition wall to the external air after passing through the external air passage and guide the external air outside, wherein the first bracket and the second bracket are attached to the stator at a position radially outward from the external air passage, the second bracket has an outlet hole to discharge the external air after passing through the external air passage, the second guide guides the external air after passing through the external air passage to the outlet hole, the first bracket has a plurality of first air holes connecting to the internal air bypass, and the plurality of first partition walls each connect the internal air bypass and the internal space of the first guide through a corresponding first air hole of the plurality of first air holes.

18. The electric motor according to claim 17, wherein the first guide is accommodated in the first bracket and attached to the stator at a position radially inward from the external air passage and to the first bracket.

19. The electric motor according to claim 18, wherein the second bracket has a second air hole connecting to the internal air bypass, the second guide is accommodated in the second bracket and attached to the stator at a position radially inward from the external air passage and to the second bracket, and the second partition wall connects the internal air bypass and the internal space of the second guide through the second air hole.

20. The electric motor according to claim 19, wherein the bypass definer is attached to the first bracket and the second bracket, covers the first air hole and the second air hole, and defines the internal air bypass with the stator.

* * * * *